(12) United States Patent
Jang et al.

(10) Patent No.: US 11,329,727 B1
(45) Date of Patent: May 10, 2022

(54) DEVICE FOR COMMUNICATING SIGNAL OF HYBRID WAVEFORM BASED ON M-FSK AND OFDM

(71) Applicant: Kookmin University Industry Academy Cooperation Foundation, Seoul (KR)

(72) Inventors: Yeong Min Jang, Seoul (KR); Ngoc Huy Nguyen, Seoul (KR)

(73) Assignee: KOOKMIN UNIV. IND. ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/236,241

(22) Filed: Apr. 21, 2021

(30) Foreign Application Priority Data

Nov. 26, 2020 (KR) .................. 10-2020-0161420
Nov. 26, 2020 (KR) .................. 10-2020-0161421
(Continued)

(51) Int. Cl.
*H04B 10/116* (2013.01)
*H04B 10/516* (2013.01)
(Continued)

(52) U.S. Cl.
CPC ....... *H04B 10/5161* (2013.01); *H04B 10/116* (2013.01); *H04B 10/69* (2013.01); *H04L 27/106* (2013.01); *H04L 27/2601* (2013.01)

(58) Field of Classification Search
CPC .................................................. H04B 10/116
See application file for complete search history.

(56) References Cited

U.S. PATENT DOCUMENTS 6,122,084 A * 9/2000 Britz .................. H04B 10/0775
385/140
6,567,199 B1 * 5/2003 Nakaoka ................ H04B 10/50
398/183
(Continued)

FOREIGN PATENT DOCUMENTS

KR 10-2008-0064804 A 7/2008
KR 10-1202669 B1 11/2012
(Continued)

OTHER PUBLICATIONS

Xin et al., 40Gb/s FSK modulated WDM-PON with variable-rate multicast overlay, 2011, OSA (Year: 2011).*
(Continued)

*Primary Examiner* — Jai M Lee
(74) *Attorney, Agent, or Firm* — Haynes and Boone, LLP

(57) ABSTRACT

A device for transmitting a signal according to some embodiments of the present disclosure relates to a device for transmitting a signal using a hybrid waveform. The device may include a modulator configured to modulate an input signal and a signal transmitter configured to transmit the modulated final transmission signal through an LED light source, wherein the modulator is configured to modulate first information into a pulse signal based on frequency shift keying (FSK), and modulate second information into an orthogonal frequency division multiplexing (OFDM) signal, wherein the first information and the second information are different from each other and mix the pulse signal and the OFDM signal into one waveform to generate the final transmission signal.

20 Claims, 20 Drawing Sheets

(30) Foreign Application Priority Data

Nov. 27, 2020 (KR) ........................ 10-2020-0162961
Nov. 30, 2020 (KR) ........................ 10-2020-0164641

(51) Int. Cl.
*H04B 10/69* (2013.01)
*H04L 27/10* (2006.01)
*H04L 27/26* (2006.01)

(56) References Cited

U.S. PATENT DOCUMENTS

| | | | | |
|---|---|---|---|---|
| 7,961,090 B2* | 6/2011 | Hu | ........................ | H05B 45/20 |
| | | | | 340/538 |
| 8,494,367 B2* | 7/2013 | Linnartz | ................ | H05B 45/22 |
| | | | | 398/78 |
| 8,842,996 B2* | 9/2014 | Yokoi | ................ | H04L 27/2697 |
| | | | | 398/183 |
| 9,590,728 B2* | 3/2017 | Roberts | ................ | H04B 10/116 |
| 9,838,121 B2* | 12/2017 | Roberts | ................... | H04L 27/12 |
| 10,009,115 B2* | 6/2018 | Caplan | ................... | H04B 10/67 |
| 10,511,771 B2* | 12/2019 | Kadambala | ............ | H04N 5/374 |
| 11,044,017 B2* | 6/2021 | Jang | ........................ | H04L 27/20 |
| 2017/0117960 A1* | 4/2017 | Peng | ................... | H04B 10/073 |
| 2019/0028192 A1* | 1/2019 | Tsonev | ............. | H04W 72/0453 |

FOREIGN PATENT DOCUMENTS

| | | |
|---|---|---|
| KR | 10-2016-0081114 A | 7/2016 |
| KR | 10-1651584 B1 | 9/2016 |
| KR | 10-1937560 B1 | 1/2019 |
| KR | 10-1937607 B1 | 4/2019 |

OTHER PUBLICATIONS

Zhang et al., A novel super-orthogonal modulation scheme for high speed optical OFDM system, 2012 (Year: 2012).*

* cited by examiner

FIG. 14
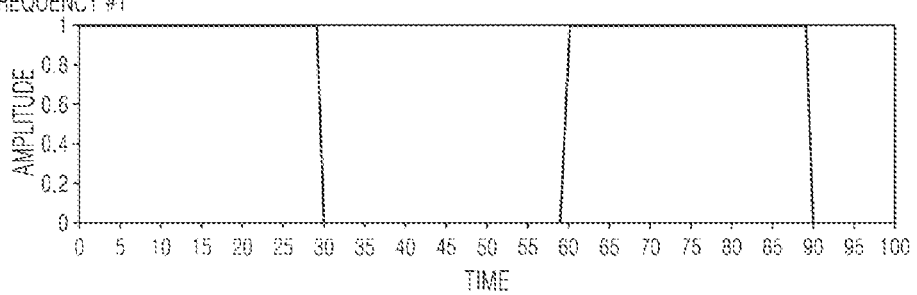
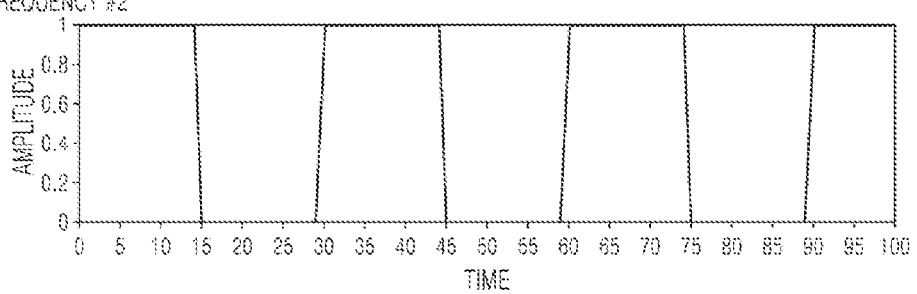
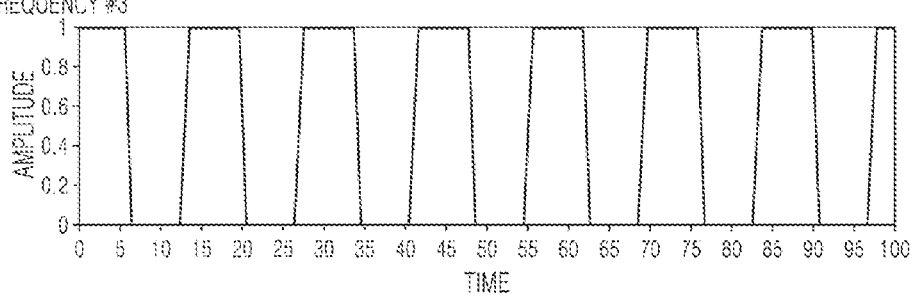

DEVICE FOR COMMUNICATING SIGNAL OF HYBRID WAVEFORM BASED ON M-FSK AND OFDM

CROSS-REFERENCE TO RELATED APPLICATION

This application claims benefit of priority to Korean Patent Application No. 10-2020-0161420, entitled "COMMUNICATION DEVICE AND COMMUNICATION METHOD USING HYBRID WAVEFORM BASED ON M-FSK AND OFDM" and filed on Nov. 26, 2020, Korean Patent Application No. 10-2020-0161421, entitled "LONG DISTANCE COMMUNICATION DEVICE AND COMMUNICATION METHOD USING HYBRID WAVEFORM BASED ON M-FSK AND OFDM" and filed on Nov. 26, 2020, Korean Patent Application No. 10-2020-0162961, entitled "APPARATUS AND METHOD FOR RECEIVING A SIGNAL OF HYBRID WAVEFORM BASED ON M-FSK AND OFDM" and filed on Nov. 27, 2020, Korean Patent Application No. 10-2020-0164641, entitled "APPARATUS AND METHOD FOR RECEIVING A SIGNAL OF HYBRID WAVEFORM BASED ON M-FSK AND OFDM AND SEPARATING MODULATED SIGNALS USING FILTER" and filed on Nov. 30, 2020, in the Korean Intellectual Property Office, the entire disclosures of which are incorporated herein by reference.

STATEMENT REGARDING KOREAN GOVERNMENT SUPPORT

This invention was supported at least in part by Ministry of Science and ICT of South Korean government for research project, the title of which is "Research on intelligent Internet of Energy (IoE) Data" managed by IITP (Institute of Information & Communications Technology Planning & Evaluation). The project code number is 1711116158.

BACKGROUND

1. Technical Field

The present disclosure relates to a hybrid waveform based on M-ary frequency shift keying (M-FSK) and orthogonal frequency division multiplexing (OFDM), and more particularly, to a technology for simultaneously transmitting or receiving different types of information using a mixed signal of a hybrid waveform generated by mixing a pulse wave signal modulated based on FSK and an OFDM signal.

2. Background

The contents described below merely provide background information on embodiments of the present disclosure, and do not constitute prior art.

Recently, lamps such as incandescent light bulbs and fluorescent lamps have been replaced with semiconductor light emitting diode (LED) lamps. Visible light communication (VLC) technology, which is a wireless communication technology that adds a communication function to wavelengths of visible light emitted from the LED lamp, is being actively studied.

In Korean Patent Registration No. 10-165184 (registered on Aug. 22, 2016; hereinafter referred to as "related art 1"), disclosed is a technology for communicating with a camera-based M-FSK scheme that uses a rolling-shutter camera. However, a general M-FSK scheme has difficulty in transmitting high-speed data.

In Korean Patent Application Publication No. 10-2008-0064804 (published on Jul. 9, 2008; hereinafter referred to as "related art 2"), disclosed is a digital optical transmission technology in which information bits are mapped based on FSK and then the mapped signal is again multiplexed based on OFDM. However, related art 2 has a limitation of FSK-modulating only the same information, rather than different types of information, and then multiplexing the modulated information with OFDM.

3. Related art documents

Related art 1: Korean Patent Registration No. 10-165184 (registered on Aug. 22, 2016)
Related art 2: Korean Patent Application Publication No. 10-2008-0064804 (published on Jul. 9, 2008)

SUMMARY

Embodiments of the present disclosure are directed to providing a technology capable of simultaneously transmitting or receiving high-speed data and low-speed data in visible light communication (VLC).

Embodiments of the present disclosure are further directed to providing a technology capable of simultaneously transmitting or receiving different types of data by using a pulse wave signal modulated based on visible light communication technology, and an OFDM modulated signal.

The present disclosure is not limited to what has been mentioned above, and other objects and advantages of the present disclosure that are not mentioned may be understood by the following description, and will be more clearly understood by the embodiments of the present disclosure. In addition, it will be appreciated that the objects and advantages of the present disclosure may be realized by the means indicated in the claims and combinations thereof.

One embodiment of the present disclosure is directed to providing a signal transmission device and method for modulating two different types of information based on M-FSK and OFDM, respectively, mixing the modulated information into one waveform, and then transmitting the one waveform to one communication channel including a LED light source.

Another embodiment of the present disclosure is directed to providing a signal reception device and method for receiving, through a rolling camera, a signal generated by modulating two different types of information based on M-FSK and OFDM, respectively, and then mixing the modulated information into one waveform.

A signal transmission device according to some embodiments of the present disclosure is a communication device using a hybrid waveform. The signal transmission device may include a modulator configured to modulate an input signal, and a signal transmitter configured to transmit the modulated final transmission signal through an LED light source. The modulator may be configured to, among first and second information that are different from each other, modulate the first information into a pulse signal based on frequency shift keying (FSK), modulate the second information into an orthogonal frequency division multiplexing (OFDM) signal, and mix the pulse signal and the OFDM signal into one waveform to generate a final transmission signal.

A signal reception device according to some embodiments of the present disclosure is a signal reception device using a hybrid waveform. The signal reception device may include a receiver including a camera configured to generate an image composed of a plurality of image frames by capturing an optical signal multiple times at different times in a rolling-shutter method that receives the optical signal, and a demodulator configured to demodulate the optical signal based on the image. The demodulator may be configured to demodulate a first signal from the same image received through the camera according to a FSK demodulation scheme based on a rolling-shutter, demodulate a second signal according to an OFDM signal demodulation scheme based on the rolling-shutter, extract first information based on the first signal, and extract second information based on the second signal, wherein the first information and the second information may be different from each other.

A signal communication device and method according to some embodiments of the present disclosure may simultaneously communicate the different types of data using the modulated pulse wave signal and the OFDM modulated signal, thereby enhancing data transmission speed in the visible light communication (VLC).

The signal communication device and method according to some embodiments of the present disclosure may mix the modulated pulse wave signal and the OFDM modulated signal into the hybrid waveform, which is one waveform, thereby simultaneously communicating the two different types of data.

The effects of the present disclose are not limited to those mentioned above, and other effects not mentioned may be clearly understood by those skilled in the art from the following description.

BRIEF DESCRIPTION OF THE DRAWINGS

FIG. 14 is a diagram illustrating a matched filter, according to some embodiments of the present disclosure.

DETAILED DESCRIPTION

Figure 1:
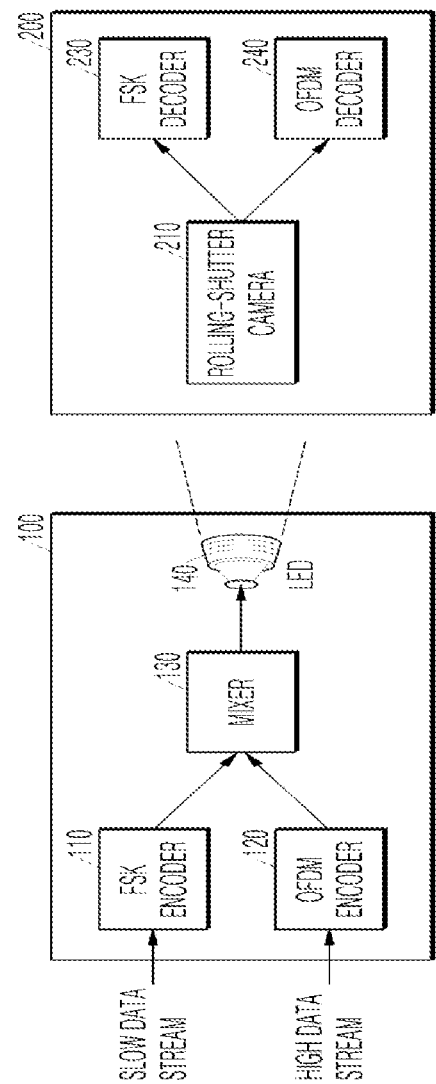
FIG. 1 is a diagram schematically illustrating communication between a signal transmission device and a signal reception device, according to some embodiments of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present disclosure, and therefore, the suffix itself will not be used to differentiate the significance or function or the corresponding term. Further, in the description of the embodiments of the present disclosure, when it is determined that the detailed description of the related art would obscure the gist of the present disclosure, the description thereof will be omitted. Also, the accompanying drawings are provided only to facilitate understanding of the embodiments disclosed in the present disclosure and therefore should not be construed as being limiting in any way. It should be understood that all modifications, equivalents, and replacements which are not exemplified herein but are still within the spirit and scope of the present disclosure are to be construed as being included in the present disclosure.

The terms such as "first," "second," and other numerical terms may be used herein only to describe various elements, but these elements should not be limited by these terms. Furthermore, these terms such as "first," "second," and other numerical terms, are used only to distinguish one element from another element.

It will be understood that when an element is referred to as being "connected", "attached", or "coupled" to another element, it may be directly connected, attached, or coupled to the other element, or intervening elements may be present. In contrast, when an element is referred to as being "directly connected", "directly attached", or "directly coupled" to another element, no intervening elements are present.

FIG. 1 illustrates communication between a signal transmission device and a signal reception device, according to some embodiments of the present disclosure.

Referring to FIG. 1, a signal transmission device 100 may be configured to modulate two different types of data based on M-FSK and OFDM, respectively, generate a final transmission signal by mixing the modulated data into one waveform by a mixer 130, and then transmit the generated final transmission signal to a communication channel 140 including an LED light source.

According to some embodiments of the present disclosure, a hybrid waveform of the final transmission signal is a signal generated by mixing an OFDM signal with a pulse wave signal generated by an M-FSK scheme based on optical camera communication (OCC) technology.

The amplitude of a low signal of a pulse wave signal generated by an existing FSK scheme or on-off keying (OOK) scheme is 0. In contrast, the hybrid waveform according to some embodiments of the present disclosure is a signal generated by mixing the OFDM signal with a pulse wave composed of a high duty having a high amplitude value and a low duty having a low amplitude value (in this specification, any one high or low portion of a pulse wave is referred to as a duty).

Accordingly, the signal transmission device according to some embodiments of the present disclosure may mix the OFDM signal with both the high duty and the low duty of the pulse wave, thereby enhancing overall data transmission speed.

In some embodiments, when the two different types of data are analog data, the signal transmission device 100 may digitally modulate the analog data and then input the modulated data to an FSK encoder 110 and an OFDM encoder 120, respectively.

In some embodiments, the two different types of data may be low-speed data and high-speed data, respectively.

In some embodiments, an LED light source included in the communication channel 140 may include at least one LED light source.

The signal reception device 200 may receive, by a rolling-shutter camera 210, the final transmission signal transmitted by the signal transmission device 100, decode, based on a rolling-shutter, signals generated from each row or column of an image sensor of the camera, and then demodulate the decoded signals by an FSK decoder 230 and an OFDM decoder 240 to extract the original different types of data.

Figure 2:
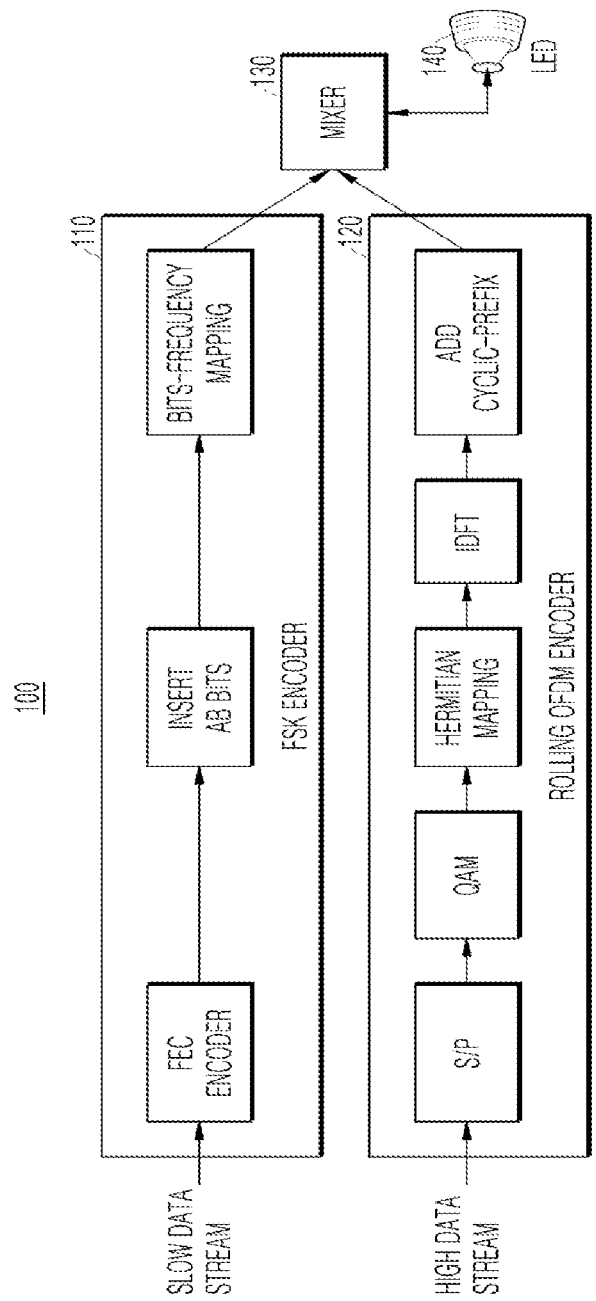
FIG. 2 is a block diagram illustrating a configuration of a signal transmission device, according to some embodiments of the present disclosure.

A configuration of the signal transmission device 100 according to some embodiments of the present disclosure will be described with reference to FIG. 2.

The signal transmission device 100 may include the FSK encoder 110, the rolling OFDM encoder 120, the mixer 130, and the communication channel 140 including the LED light source. The signal transmission device 100 may also include a clock generator that generates a clock signal.

The FSK encoder 110 may modulate the obtained first information into a pulse wave based on M-ary FSK. The pulse wave is composed of a high duty and a low duty. Both the high duty and the low duty may have a positive amplitude value.

The FSK encoder 110 may include a forward error correction (FEC) encoder, an asynchronous bits (Ab bits) inserter, and a bits-frequency mapper configured to allocate respective information bits included in the first information to each frequency corresponding to the respective information bits using a predetermined M-FSK frequency table. In the predetermined M-FSK frequency table, the respective information bits are assigned a frequency corresponding thereto.

The OFDM encoder 120 may include a serial to parallel converter configured to convert the obtained second information in parallel, a quadrature amplitude modulation (QAM) modulator configured to perform QAM modulation according to each information bit, a Hermitian mapper configured to cause OFDM symbols to have non-imaginary values after inverse discrete Fourier transform (IDFT) transformation, an IDFT transformer, and a cyclic prefix inserter.

Figure 3:
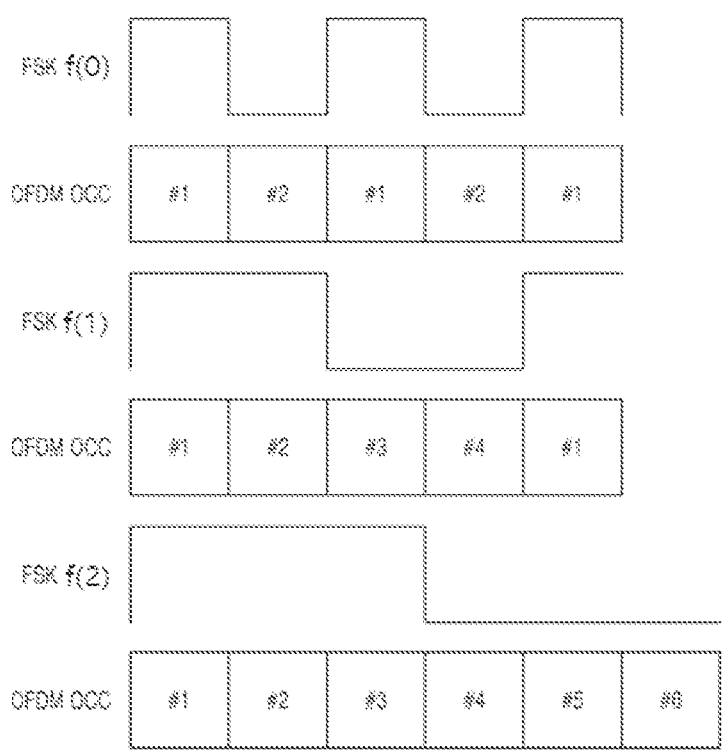
FIG. 3 is a diagram illustrating frequencies used for FSK modulation and OFDM symbols mixed at each frequency of FSK, according to some embodiments of the present disclosure.

FIG. 3 illustrates a mapping of a frequency to information bits included in packets generated by transforming the first information in the M-FSK encoder 110, according to some embodiments of the present disclosure.

When the M-FSK encoder 110 allocates one of a plurality of pulse waves having different specific frequencies to respective information bits corresponding to the first information, the frequency of each pulse wave may be set based on the number of the OFDM symbols of the OFDM signal to be included in the pulse wave.

$$f_{OFDM} = N_{OFDM\_frame} \cdot f_{FSK} \cdot n \qquad \text{Equation 1}$$

$$f_{FSK} = \frac{f_{OFDM}}{n \cdot N_{OFDM\_frame}} = \frac{f_0}{n} \qquad \text{Equation 2}$$

In order to mix the OFDM signal with the pulse wave generated based on M-FSK in consideration of the rolling rate of the rolling-shutter camera used in OCC technology, the M-FSK encoder 110 may be set such that the frequency ($f_{FSK}$) of the pulse wave generated based on M-FSK and the frequency ($f_{oFDM}$) of the rolling OFDM symbols satisfy <Equation 1> and <Equation 2>, where n is the number of OFDM frames mixed with one duty of the pulse wave, and $N_{OFDM\_frame}$ is the length of the OFDM frame, which is OFDM symbols.

Accordingly, the predetermined M-FSK frequency table may be as shown in <Table 1> below.

TABLE 1

| Packet of bits input | Frequency output |
|---|---|
| Preamble 1 | f0 |
| 00 | f1 = f0/2 |
| 01 | f2 = f0/3 |
| 10 | f3 = f0/4 |
| 11 | f4 = f0/5 |
| Preamble 2 (Ab bit frequency) | f5 = f0/6 |

The M-FSK encoder 110 allocates an asynchronous symbol constituting packets generated by transforming the first information, and a pulse wave having a frequency corresponding to a bit value of a data packet, according to <Table 1>, which is the predetermined M-FSK frequency table. In such a case, amplitudes of both the high duty and the low duty of the pulse wave may have a positive value.

A difference in pulse frequency between any two pulse signals having adjacent pulse frequencies among a plurality of pulse signals included in <Table 1> may be set to be different from each other.

For example, the difference between the pulse frequencies f1 and f2 may be different from the difference between the pulse frequencies f2 and f3.

In some embodiments, in order to synchronize the rolling-shutter camera 210 of the signal reception device 200 with each pulse wave of a frequency corresponding to respective information bits, the M-FSK encoder 110 may generate a pulse wave by inserting a pulse wave having a frequency f5 corresponding to the Ab bits.

As described in <Table 1> and above, when mixing an OFDM signal with a pulse wave having a corresponding frequency, the mixer 130 may mix a suitable number of OFDM symbols for each frequency.

Referring to FIG. 3 and <Table 1>, the mixer 130 may mix two OFDM symbols in one period of a pulse wave of frequency f0 (thus, mix one OFDM symbol with each duty), mix four OFDM symbols in one period of a pulse wave of frequency f1 (thus, mix two OFDM symbols with each duty), and mix six OFDM symbols in one period of a pulse wave of frequency f2 (thus, mix three OFDM symbols with each duty).

That is, the frequency of each pulse wave used for M-FSK modulation may be set to be inversely proportional to the number of the OFDM symbols of the OFDM signal mixed with one duty of the pulse wave.

In some embodiments, since, when the rolling rate of the rolling-shutter camera 210 of the signal reception device 200 is not constant, some of the transmitted frames may be lost, the mixer 130 may repeatedly insert the same OFDM frame corresponding to the same OFDM symbol into the pulse wave as illustrated in FIG. 3.

Figure 4:
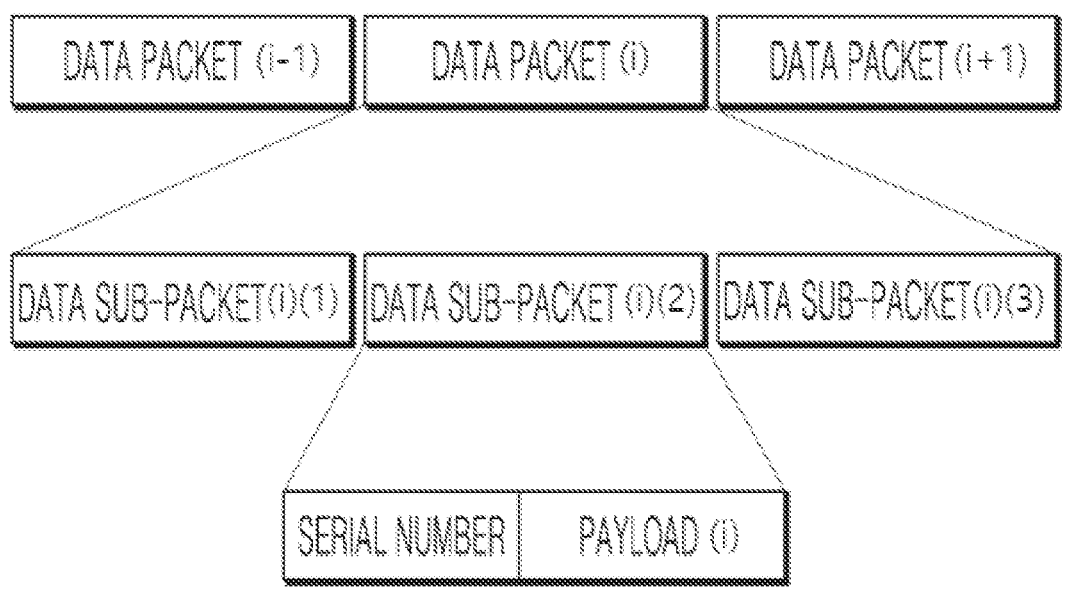
FIG. 4 is a diagram illustrating a data packet structure for transmitting OFDM symbols, according to some embodiments of the present disclosure.

FIG. 4 illustrates a data packet for transmitting an OFDM frame according to some embodiments of the present disclosure. The OFDM frame may be transmitted based on a plurality of data packets i−1, i, and i+1.

Each of the plurality of data packets i−1, i, and i+1 includes a plurality of data sub-packets i1, i2, and i3 (n data sub-packets), and the data sub-packet i2 may include a payload representing OFDM symbols corresponding to a portion of the second information allocated to the data sub-packet i2.

In some embodiments, in order to prevent packet loss due to a variable frame rate of a receiving side camera, the data sub-packets included in one data packet may include the same payload representing the same OFDM symbol.

In some embodiments, a serial number may be assigned to each data packet, and the serial number may be assigned to consecutive data packets as consecutive numbers.

In some embodiments, the data sub-packet i2 may include a serial number of the data sub-packet i2, and a payload representing OFDM symbols corresponding to a portion of second information allocated to the data sub-packet i2.

In some embodiments, data sub-packets included in one data packet may have the same serial number. Accordingly, even if a portion of a specific packet is lost, loss of information may be prevented by a plurality of data sub-packets to which the information is copied, thereby preventing information transmission errors. In addition, redundantly received signals may be removed through the serial number, and it may be determined whether there is any missing content in the received signal.

A hybrid waveform generated by mixing the OFDM signal with the pulse wave generated based on M-FSK, using the mixer 130 according to some embodiments of the present disclosure, will be described with reference to FIGS. 3 and 5.

The mixer 130 may mix the OFDM signal to both the high duty and the low duty of the pulse wave generated by the FSK encoder 110. In such a case, the number of OFDM frames mixed with the high duty and the low duty may be the same.

Figure 5:
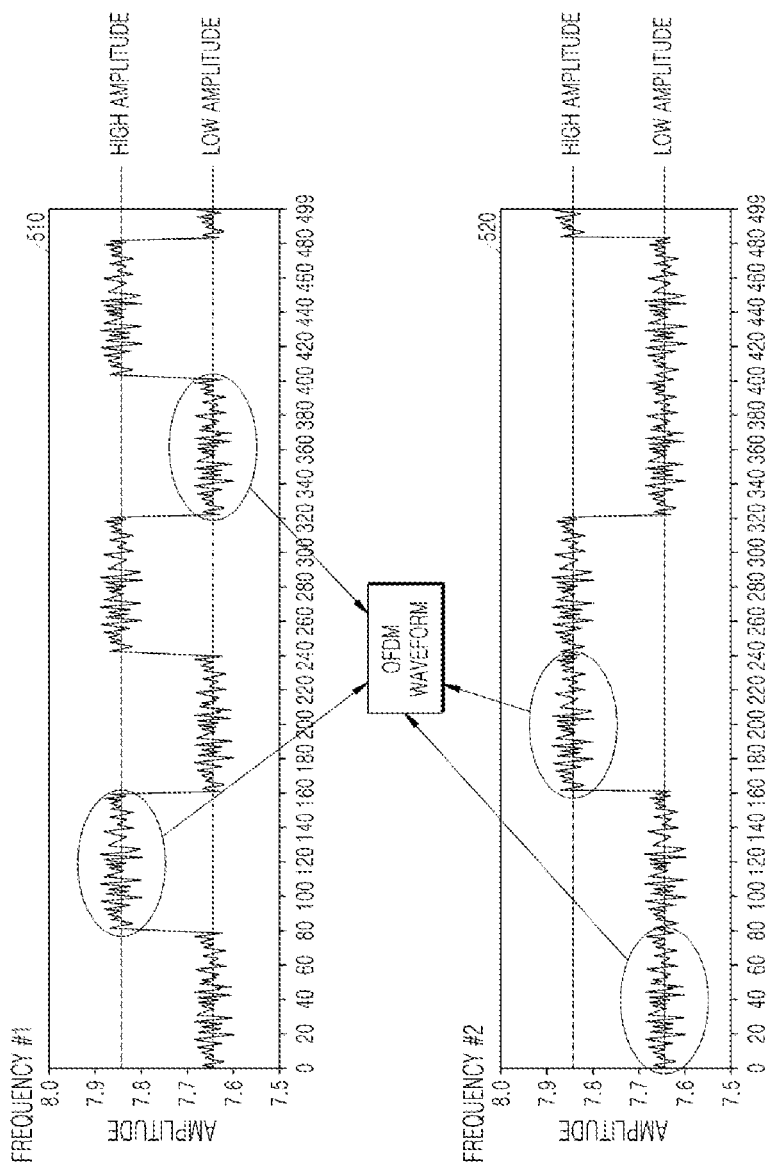
FIG. 5 is a diagram illustrating a hybrid waveform that a signal transmission device generates by mixing an OFDM signal generated by OFDM modulation with a pulse wave generated by M-FSK modulation, according to some embodiments of the present disclosure.

When the pulse wave modulated by the M-FSK scheme and the OFDM signal modulated by the OFDM scheme are mixed through the above-described method, a final transmission signal of a hybrid waveform as illustrated in FIG. 5 may be generated. The final transmission signal as illustrated in FIG. 5 is an example of final transmission signals generated by mixing an OFDM signal with a pulse wave having a different frequency.

Referring to FIG. 5, the final transmission signal may be generated such that the OFDM signal is mixed with both a high duty and a low duty of the pulse wave of the final transmission signal, and both high duty and low duty have a positive amplitude value.

In some embodiments, the OFDM encoder 120 may generate an OFDM signal such that a difference between the minimum and maximum values of the OFDM signal is less than half of the difference between the high duty and the low duty of the pulse wave. This is to prevent the low duty and the high duty from being confused at the receiving side by preventing the OFDM signal from greatly changing in the hybrid waveform mixed based on M-FSK and OFDM. In order to reduce confusion between the low duty and the high duty in the pulse wave, the amplitude of the OFDM signal may be set to be ¼, ⅙, ⅛ or ¹⁄₁₀ of the amplitude of the pulse wave.

Figure 6:
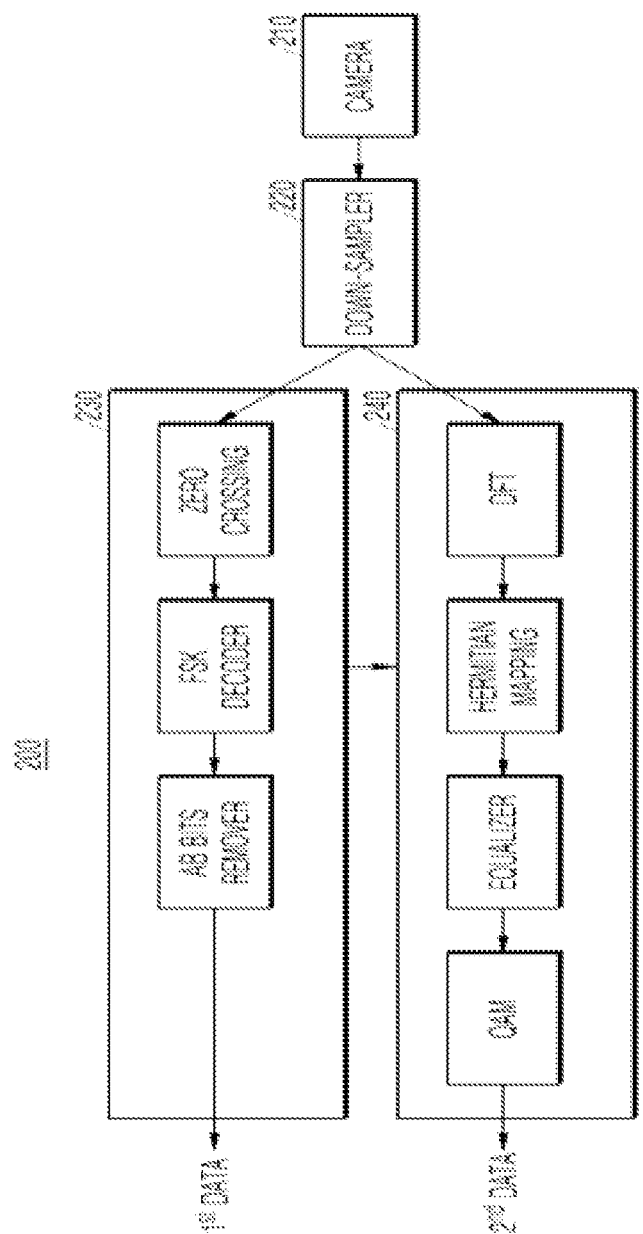
FIG. 6 is a flowchart illustrating a signal transmission method, according to some embodiments of the present disclosure.

FIG. 6 illustrates a signal reception device 200 according to some embodiments of the present disclosure.

The signal reception device 200 may include a down-sampler 220 configured to down-sample an image obtained by an image sensor into a one-dimensional signal, an FSK decoder 230, and an OFDM decoder 240. The FSK decoder 230 includes a zero-crossing unit configured to extract zero-crossing points from an intermediate frequency signal (IF signal) and extract a frequency period using a time between the extracted zero-crossing points, an FSK decoder configured to perform decoding based on the extracted frequency period, and an Ab bits remover configured to remove the Ab bits. The OFDM decoder 240 includes a discrete Fourier transform (DFT) transformer configured to perform the DFT after removing a cyclic prefix, a Hermitian mapper, an equalizer configured to reduce amplitude deformation, and a QAM demodulator.

In some embodiments, the FSK decoder 230 may determine amplitude values of the high duty and the low duty of the FSK pulse wave by scanning the image generated by the image sensor, and determine an intermediate value of the amplitude values as a reference value for determining the high duty and the low duty.

In some embodiments, the FSK decoder 230 may determine a width of the FSK pulse wave based on the determined high duty and low duty of the FSK pulse wave, and the OFDM decoder 240 may demodulate the OFDM signal based on a signal obtained from the high duty and the low duty of the pulse wave in consideration of the width of the FSK pulse wave.

Figure 7:
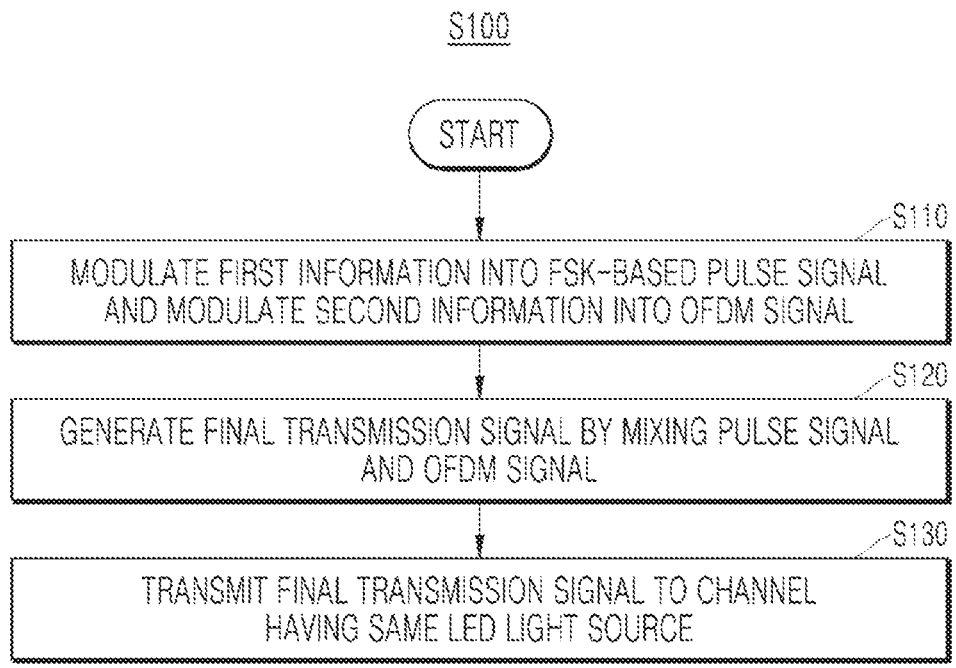
FIG. 7 is a block diagram illustrating a configuration of a signal reception device, according to some embodiments of the present disclosure.

FIG. 7 illustrates a signal transmission method using a hybrid waveform, according to some embodiments of the present disclosure.

Referring to FIG. 7, the signal transmission method the hybrid waveform according to some embodiments of the present disclosure may be performed as follows.

The signal transmission device may modulate first information and second information obtained from two different types of information using different modulation methods, respectively, wherein the first information may be modulated based on an M-FSK scheme to generate a pulse wave, and the second information may be modulated based on an OFDM scheme to generate an OFDM signal (S110).

The signal transmission device may correspondingly allocate one of a plurality of pulse waves having different pulse frequencies to respective information bits generated from the first information, and the relationship between respective information bits and pulse waves having a specific pulse frequency may be as shown in <Table 1> described above.

In the signal transmission device, the pulse frequency of the pulse wave corresponding to the respective information bits generated from the first information may be preset based on the number of symbols of the OFDM signal included in the pulse wave. For example, in one period of a pulse wave corresponding to any information bits, the pulse frequency of the pulse wave may be set such that two OFDM symbols may be mixed. In addition, in one period of a pulse wave corresponding to other information bits, the pulse frequency of the pulse wave may be set such that three OFDM symbols may be mixed.

The first information and the second information may each be obtained from stream data of different rates.

The signal transmission device may generate the final transmission signal by mixing the generated pulse signal and OFDM signal (S120). In such a case, the pulse signal is composed of a high duty and a low duty both having a positive amplitude value, and the OFDM symbol may be mixed with both the high duty and the low duty.

The signal transmission device may transmit, to one signal transmission channel, a final transmission signal generated by modulating the different types of information based on M-FSK and OFDM and then mixing the modulated information into one waveform, wherein the final transmission signal is transmitted through the LED light source (S130).

FIG. 1 illustrates communication between the signal transmission device and the signal reception device according to some embodiments of the present disclosure. Portions overlapping with the previous description will be omitted.

Referring to FIG. 1, the signal transmission device 100 may be configured to modulate two different types of data based on M-FSK and OFDM, respectively, generate a final transmission signal by mixing the modulated data into one waveform by the mixer 130, and then transmit the generated final transmission signal to the same communication channel 140 including the LED light source.

In some embodiments, the signal transmission device 100 may determine a distance to the signal reception device 200, and generate a final transmission signal by mixing an OFDM signal only with a high duty of an FSK pulse wave when the distance to the signal reception device 200 is longer than a predetermined reference distance.

The signal reception device 200 may receive the final transmission signal transmitted by the signal transmission device 100 through the rolling-shutter camera 210, decode signals generated from each row or column of the image sensor of the camera based on the rolling-shutter, and then demodulate the decoded signals by the FSK decoder 230 and the OFDM decoder 240 to extract the original different types of data.

The configuration of the signal transmission device 100 according to some embodiments of the present disclosure will be described with reference to FIG. 2.

The signal transmission device 100 may include an FSK encoder 110, a rolling OFDM encoder 120, a mixer 130, and a communication channel 140 including an LED light source. The signal transmission device 100 may also include a clock generator configured to generate a clock signal.

The FSK encoder 110 may modulate the obtained first information into a pulse wave based on M-ary FSK. The pulse wave may be composed of a high duty and a low duty. Both the high duty and the low duty may have a positive amplitude value, or in another embodiment, only the high duty may have a positive amplitude value.

Figure 8:
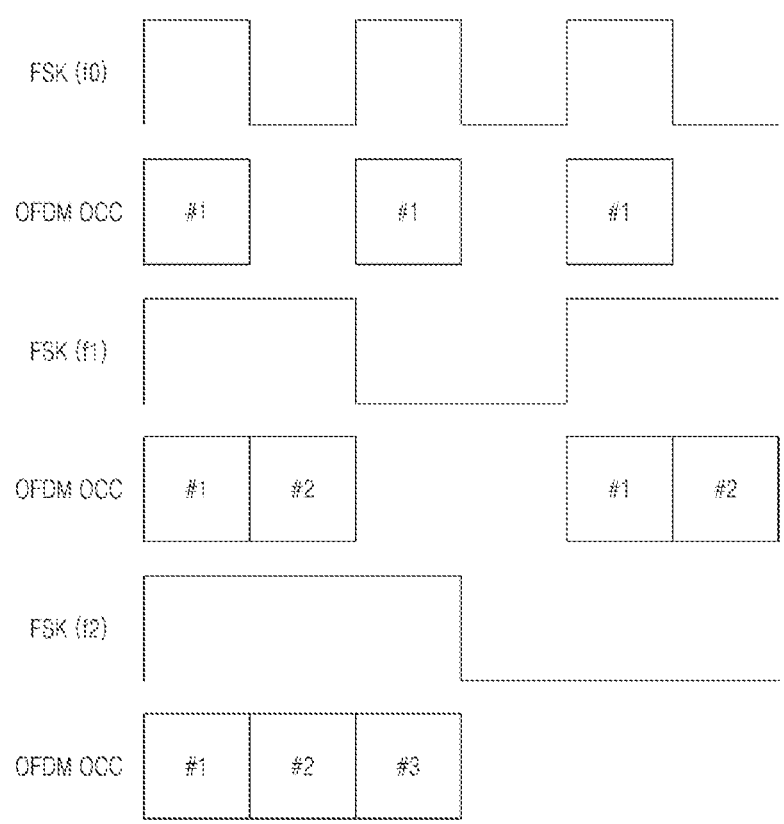
FIG. 8 is a diagram illustrating a mapping of a frequency to information bits included in packets generated by transforming information of an M-FSK encoder, according to some embodiments of the present disclosure.

FIG. 8 illustrates a mapping of a frequency to information bits included in packets generated by transforming first information in the M-FSK encoder 110, according to some embodiments of the present disclosure.

When the M-FSK encoder 110 allocates one of a plurality of pulse waves having specific frequencies to respective information bits corresponding to the first information, in a case in which the OFDM signal is mixed only with the high duty of the FSK pulse wave, the frequency of each pulse wave may be set based on the number of OFDM symbols of the OFDM signal to be included in the high duty of the pulse wave.

$$f_{OFDM} = N_{OFDM\_frame} \cdot f_{FSK} \cdot 2m \qquad \text{Equation 3}$$

$$f_{FSK} = \frac{f_{OFDM}}{2 \cdot m \cdot N_{OFDM\_frame}} = \frac{f_0}{m} \qquad \text{Equation 4}$$

$$f_0 = \frac{f_{OFDM}}{2 \cdot N_{OFDM\_frame}} \qquad \text{Equation 5}$$

In order to mix the OFDM signal with the pulse wave generated based on M-FSK in consideration of the rolling rate of the rolling-shutter camera used in OCC technology, the M-FSK encoder 110 may be set such that the frequency ($f_{FSK}$) of the pulse wave generated based on M-FSK and the frequency ($f_{oFDM}$) of the rolling OFDM symbol satisfy <Equation 3> to <Equation 5>, where m is the number of OFDM frames mixed with the one duty of the pulse wave, and $N_{OFDM\_frame}$ is the length of the OFDM frame, which are the OFDM symbols.

Accordingly, the predetermined M-FSK frequency table may be as shown in <Table 2> below.

TABLE 2

| Packet of bits input | Frequency output |
|---|---|
| Preamble 1 | f0 |
| 00 | f1 = f0/m = f0/2 |
| 01 | f2 = f0/m = f0/3 |
| 10 | f3 = f0/m = f0/4 |
| 11 | f4 = f0/m = f0/5 |
| Preamble 2 (Ab bit frequency) | f5 = f0/m = f0/6 |

The M-FSK encoder 110 allocates an asynchronous symbol constituting packets generated by transforming the first information, and a pulse wave having a frequency corresponding to a bit value of the packets, according to <Table 2>, which is the predetermined M-FSK frequency table. When the final transmission signal for a long distance is generated, only the amplitude of the high duty of the pulse wave may have a positive value.

A difference in pulse frequency between any two pulse signals having adjacent pulse frequencies among a plurality of pulse signals included in <Table 2>, which is the M-FSK frequency table, may be set to be different from each other.

For example, the difference between the pulse frequencies f1 and f2 may be different from the difference between the pulse frequencies f2 and f3.

In some embodiments, in order to synchronize the rolling-shutter camera 210 of the signal reception device 200 with each pulse wave of a frequency corresponding to respective information bits, the M-FSK encoder 110 may generate a pulse wave by inserting a pulse wave having a frequency f5 corresponding to the Ab bits.

As described in <Table 2> and above, when mixing the OFDM signal with a pulse wave having a corresponding frequency, the mixer 130 may mix a suitable number of OFDM symbols for each frequency.

Referring to FIG. 8 and <Table 2>, when generating the final transmission signal for the long distance, the mixer 130 may mix one OFDM symbol with a high duty of one period of a pulse wave of frequency f0, mix two OFDM symbols with a high duty of one period of a pulse wave of frequency f1, and mix three OFDM symbols with a high duty of one period of a pulse wave of frequency f2 (thus, mix three OFDM symbols with each high duty).

That is, the frequency of each pulse wave used for M-FSK modulation may be set to be inversely proportional to the number of OFDM symbols of an OFDM signal mixed in one period (and high duty) of the pulse wave.

In some embodiments, since, when the rolling rate of the rolling-shutter camera 210 of the signal reception device 200 is not constant, some of the transmitted frames may be lost, the mixer 130 may repeatedly insert the same OFDM frame corresponding to the same OFDM symbol into the pulse wave, as illustrated in FIG. 8.

A hybrid waveform generated by mixing the OFDM signal with the pulse wave generated based on M-FSK using the mixer 130 according to some embodiments of the present disclosure will be described with reference to FIGS. 9 and 10.

Figure 9:
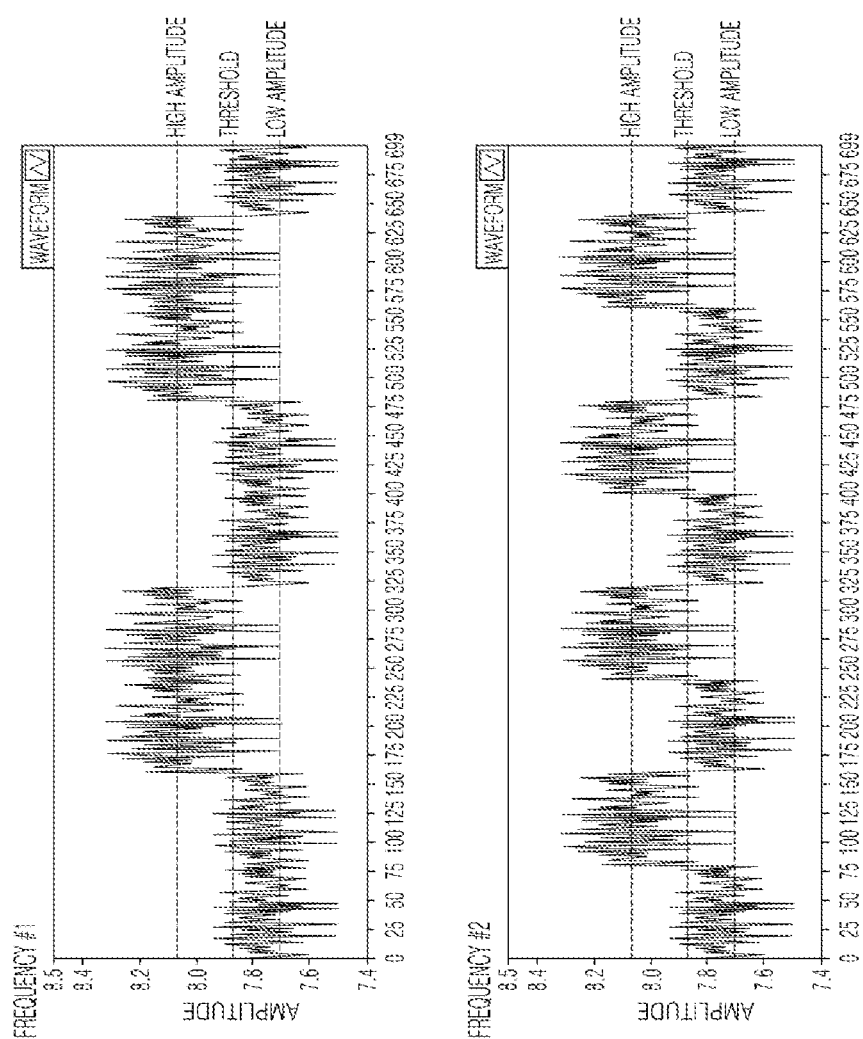
FIG. 9 is a diagram illustrating a hybrid waveform, according to some embodiments of the present disclosure.

FIG. 9 is an example of a hybrid waveform generated by mixing an OFDM signal with both a high duty and a low duty of a pulse wave generated based on M-FSK, according to some embodiments of the present disclosure. In such a case, an amplitude value of the low duty of the pulse wave may have a positive amplitude value, unlike the prior art. The signal reception device receiving, by the rolling camera from the LED light source, the final transmission signal generated by mixing the OFDM signal with both the high duty and the low duty of the pulse wave may generate, from an image, the final transmission signal as illustrated in FIG. 5.

In such a case, because of a decrease in signal strength due to a long distance, the difference between the amplitude values of the high duty and the low duty of the pulse wave become smaller. Accordingly, it may be difficult for the signal reception device to distinguish between the high duty and the low duty of the pulse wave. In particular, when the OFDM signal is mixed with both the high duty and the low duty, it may be more difficult for the signal reception device to distinguish between the high duty and the low duty of the pulse wave.

In some embodiments, the signal transmission device 100 may include a controller 150. The controller 150 determines the distance to the signal reception device 200 that receives the final transmission signal, and determines, based on the determined distance, whether to mix the OFDM signal with both the high duty and the low duty of the pulse wave generated based on M-FSK or whether to mix the OFDM signal only with the high duty.

In some embodiments, when the distance to the signal reception device 200 is greater than or equal to a predetermined reference distance, the controller 150 may control the FSK encoder 110, the OFDM encoder 120, and the mixer 130 in order to mix the OFDM signal only with the high duty of the pulse wave generated based on M-FSK.

In some embodiments, the distance to the signal reception device 200, which is a destination of the final transmission signal, may be previously stored in a storage device.

In some embodiments, the controller 150 may control the FSK encoder 110, the OFDM encoder 120, and the mixer 130 based on ambient light or weather so as to mix the OFDM signal only with the high duty of the pulse wave generated based on M-FSK.

An embodiment in which the signal reception device 200 mixes the OFDM signal only with the high duty of the pulse wave will be described below.

The mixer 130 may mix the OFDM signal with the high duty of the pulse wave generated by the FSK encoder 110.

Figure 10:
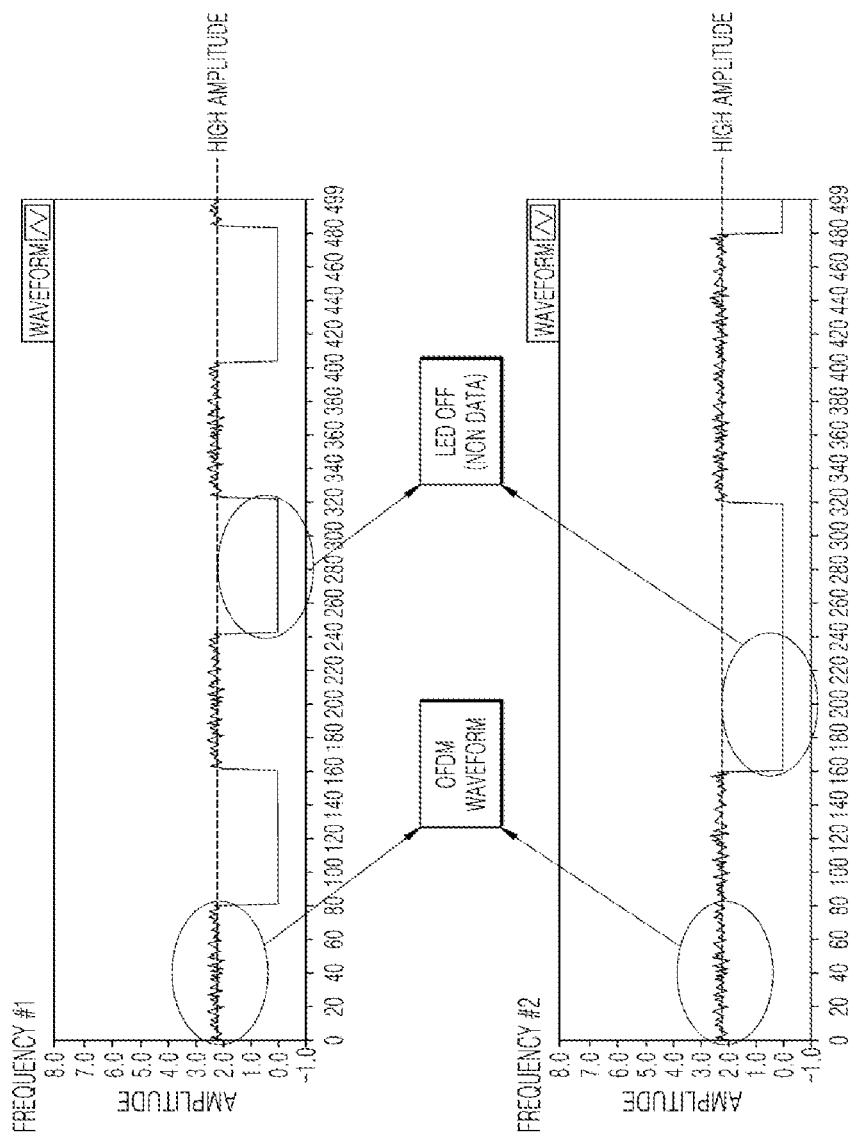
FIG. 10 is a diagram illustrating a hybrid waveform, according to some embodiments of the present disclosure.

When the pulse wave modulated by the M-FSK scheme and the OFDM signal modulated by the OFDM scheme are mixed through the above-described method, the final transmission signal of the hybrid waveform as illustrated in FIG. 10 may be generated. The final transmission signal as illustrated in FIG. 10 is an example of signals generated by mixing the OFDM signal with pulse waves having a different frequency.

Referring to FIG. 10, the final transmission signal may be generated such that the OFDM signal is mixed with the high duty of the pulse wave of the final transmission signal, and the high duty has a positive amplitude value and the low duty has a value of zero.

FIG. 6 illustrates a signal reception device 200 according to some embodiments of the present disclosure.

The signal reception device 200 may include a down-sampler 220 configured to down-sample an image obtained by an image sensor into a one-dimensional signal, an FSK decoder 230, and an OFDM decoder 240. The FSK decoder 230 includes a zero-crossing unit configured to extract zero-crossing points from an intermediate frequency signal (IF signal) and extract a frequency period using a time between the extracted zero-crossing points, an FSK decoder configured to perform decoding based on the extracted frequency period, and an Ab bits remover configured to remove Ab bits. The OFDM decoder 240 includes a discrete Fourier transform (DFT) transformer configured to perform the DFT after removing a cyclic prefix, a Hermitian mapper, an equalizer configured to reduce amplitude deformation, and a QAM demodulator.

The FSK decoder 230 may scan an image generated by the OCC rolling camera so as to determine whether the OFDM signal is mixed only with the high duty of the pulse wave of the final transmission signal or whether the OFDM signal is mixed with both the high duty and the low duty.

In some embodiments, when the OFDM signal is mixed only with the high duty of the pulse wave of the final transmission signal, the FSK decoder 230 may scan the image generated by the image sensor so as to determine an amplitude value of the high duty of the FSK pulse wave.

In some embodiments, the FSK decoder 230 may determine the width of the FSK pulse wave based on the determined high duty or low duty of the FSK pulse wave. The FSK decoder 240 may demodulate the OFDM signal based on a signal obtained from the high duty of the pulse wave in consideration of the width of the FSK pulse wave, or demodulate the OFDM signal based on a signal obtained from both the high duty and the low duty.

Figure 11:
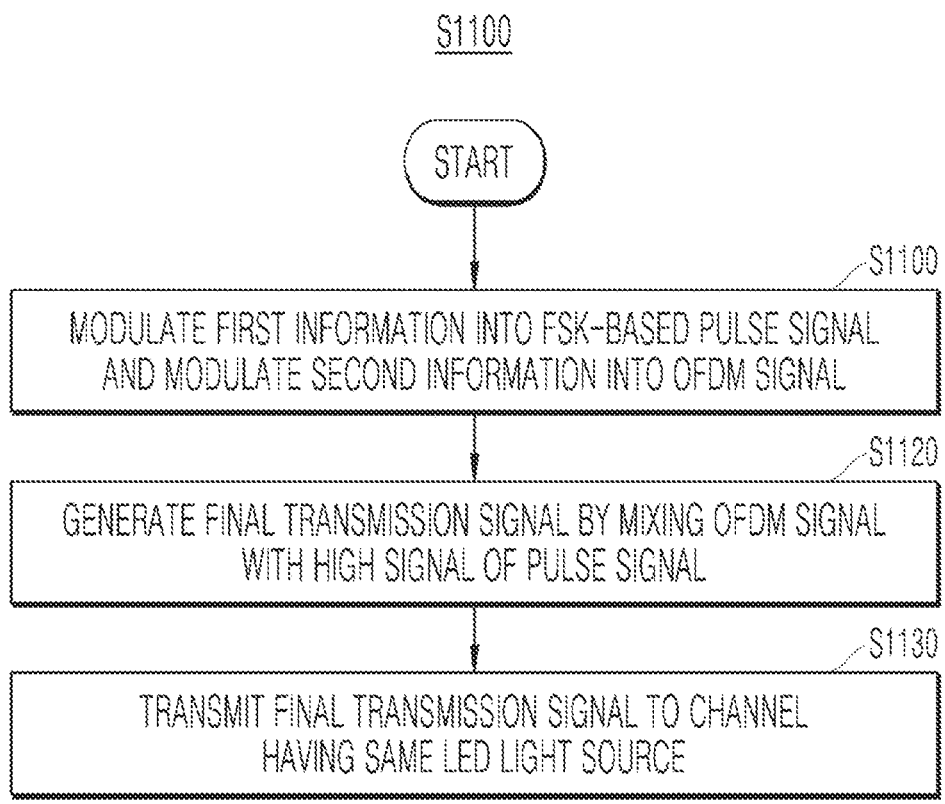
FIG. 11 is a flowchart illustrating a signal transmission method using a hybrid waveform, according to some embodiments of the present disclosure.

FIG. 11 illustrates a signal transmission method using a hybrid waveform according to some embodiments of the present disclosure.

Referring to FIG. 11, the signal transmission method using the hybrid waveform according to some embodiments of the present disclosure may be performed as follows.

The signal transmission device may modulate first information and second information obtained from two different types of information by different modulation methods, respectively, wherein the first information may be modulated based on the M-FSK scheme to generate a pulse wave, and the second information may be modulated based on the OFDM scheme to generate an OFDM signal (S1110).

The signal transmission device may correspondingly allocate a pulse wave having a different pulse frequency to information bits generated from the first information, and the relationship between respective information bits and pulse waves having a specific pulse frequency may be as shown in <Table 2> described above.

In the signal transmission device, the pulse frequency of the pulse wave corresponding to the information bits generated from the first information may be preset based on the number of symbols of the OFDM signal included in the pulse wave. For example, in one period of a pulse wave corresponding to any information bits, the pulse frequency of the pulse wave may be set such that two OFDM symbols may be mixed. In addition, in one period of a pulse wave corresponding to other information bits, the pulse frequency of the pulse wave may be set such that three OFDM symbols may be mixed.

The first information and the second information may each be obtained from stream data of different rates.

The signal transmission device may generate the final transmission signal by mixing the generated pulse signal and OFDM signal (S1120). In such a case, the pulse signal is composed of a high duty having a positive amplitude value and a low duty having a value of 0, and the OFDM symbol may be mixed only with the high duty. In some embodiments, the pulse signal is composed of a high duty and a low duty both having a positive amplitude value, and the OFDM symbol may be mixed with both the high and the low duty.

The signal transmission device may transmit, to one signal transmission channel, a final transmission signal generated by modulating different types of information based on M-FSK and OFDM and then mixing the modulated information into one waveform, wherein the final transmission signal may be transmitted through the LED light source (S1130).

Figure 12:
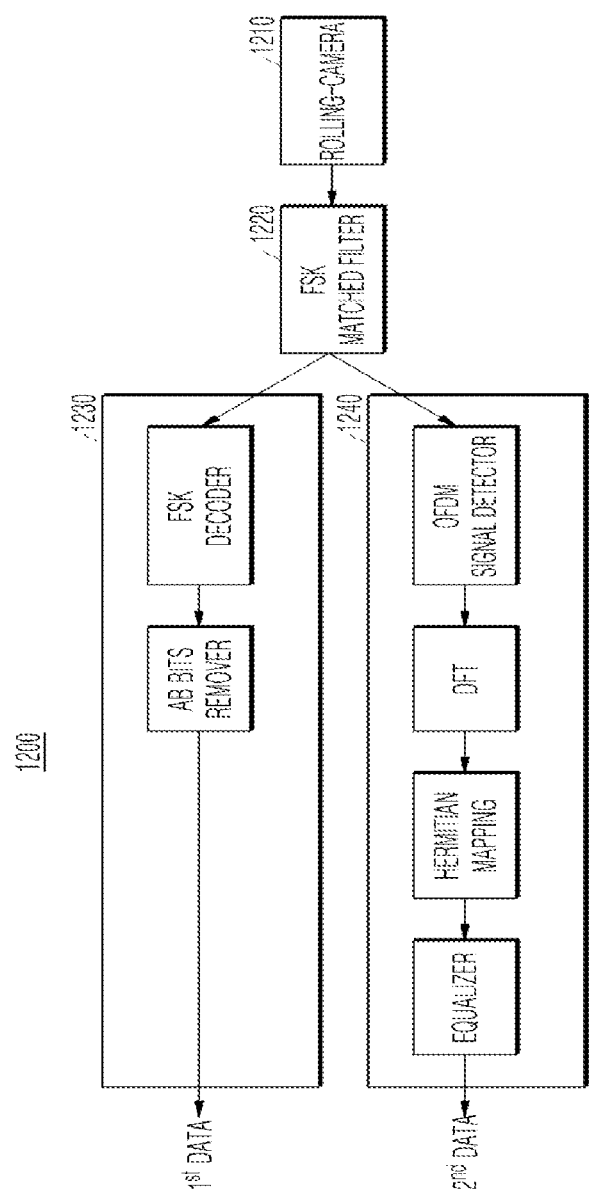
FIG. 12 is a diagram illustrating a signal reception device, according to some embodiments of the present disclosure.

FIG. 12 illustrates a signal reception device 1200 according to some embodiments of the present disclosure.

The signal reception device 1200 may include a rolling camera 1210 configured to generate an image based on a signal obtained by an image sensor in a rolling-shutter method that receives an optical signal, a down-sampler configured to down-sample the image obtained by the image sensor into a one-dimensional signal, a matched filter 1220 configured to extract a frequency of the FSK modulated signal using a plurality of matched filters, an FSK decoder 1230 that includes an FSK decoder configured to perform decoding based on the extracted frequency and an Ab bits remover configured to remove Ab bits, and an OFDM decoder 1240. The OFDM decoder 1240 includes an OFDM signal detector configured to detect an OFDM modulated signal, a discrete Fourier transform (DFT) transformer configured to perform the DFT after removing a cyclic prefix, an equalizer configured to reduce amplitude deformation, a Hermitian mapper, and a QAM demodulator.

The rolling camera continuously captures an ON/OFF image of an LED light source multiple times at different times, and generates an image frame by storing each captured image in one row or column of the image sensor. The rolling camera may obtain a signal value corresponding to the brightness of the LED light source according to the ON/OFF of the LED light source, from one row or column of the image sensor of the rolling camera, by sequentially exposing each row or column of the image sensor. The rolling camera may generate a plurality of image frames. In the following description, it is assumed that the rolling camera sequentially exposes each row of the image sensor.

The down-sampler generates a one-dimensional brightness signal (first signal) based on an amount of charge captured by the image sensor according to a brightness value of the light source captured for each row.

Figure 15:
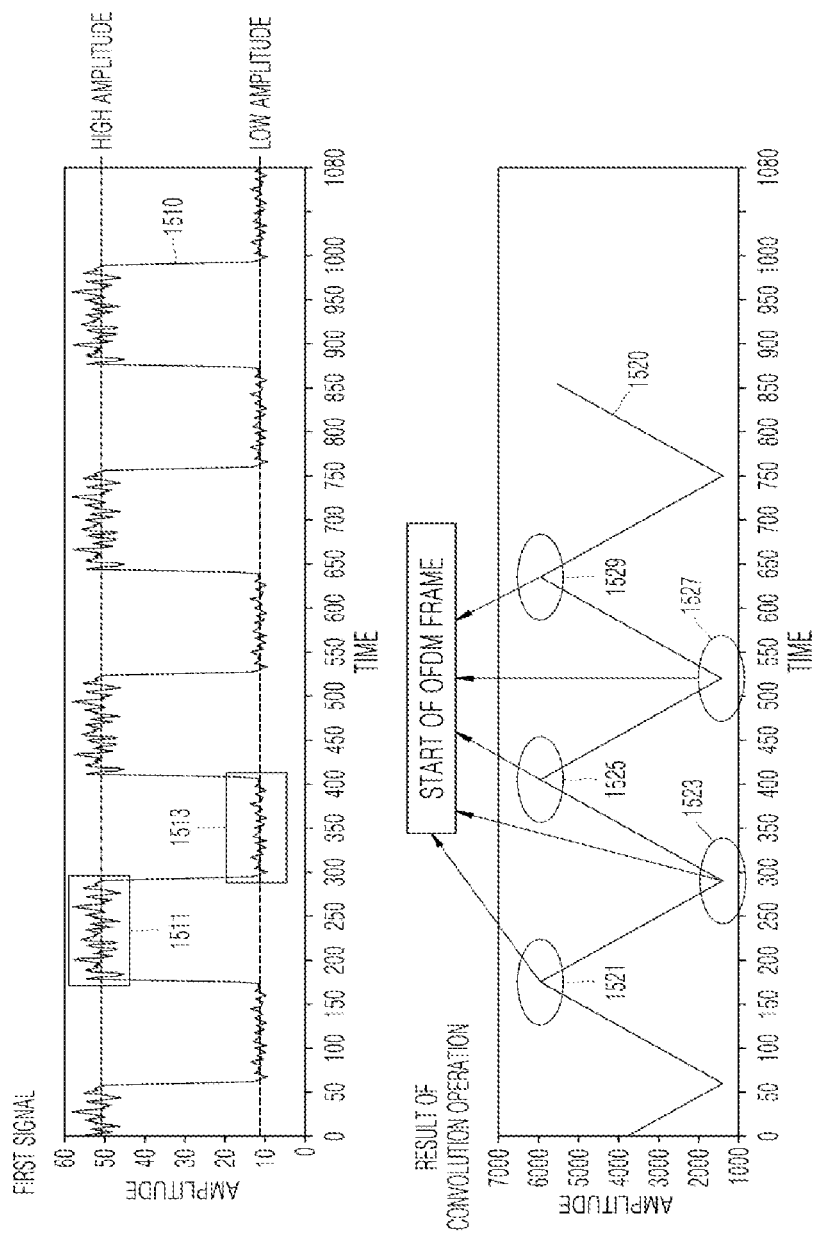
FIG. 15 is a diagram illustrating a method for determining a start position of an OFDM modulated signal, according to some embodiments of the present disclosure.

The first signal generated by the down-sampler based on the plurality of image frames may be a signal 1510 as illustrated in FIG. 15. Values in consideration of the order of each row and the rolling-rate of the camera may be set as a time axis of the first signal.

The first signal is generated by the rolling camera receiving the ON/OFF image of the LED light source according to the hybrid waveform generated by the signal transmission device 100 as illustrated in FIG. 5 or FIG. 10. In addition, the first signal may include an FSK modulated signal and an OFDM modulated signal.

Referring to FIG. 15, the first signal 1510 may include an FSK modulated signal composed of a high duty and a low duty and OFDM modulated signals 1511 and 1513 mixed with both the high duty 1511 and the low duty 1513. Both the high duty and the low duty may have a positive amplitude value.

The matched filter 1220 may detect an FSK modulated signal and an OFDM modulated signal included in the first signal based on a result of a convolution operation of the first signal and the plurality of matched filters, and the FSK decoder 1230 and the OFDM decoder 1240 may extract different types of data based on the FSK modulated signal and the OFDM modulated signal, respectively.

Figure 13:
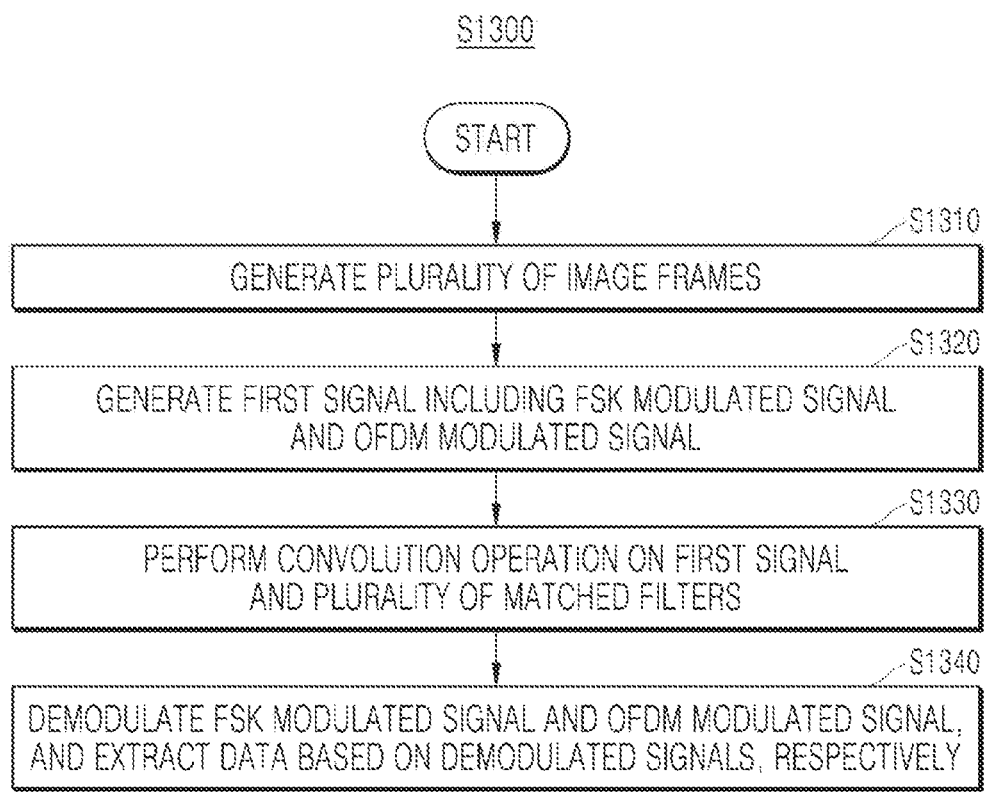
FIG. 13 is a flowchart illustrating a signal reception method performed by a signal reception device, according to some embodiments of the present disclosure.

FIG. 13 illustrates a signal reception method performed by the signal reception device according to some embodiments of the present disclosure.

The signal reception device may obtain a signal value corresponding to the brightness of the LED light source according to the ON/OFF of the LED light source, from one row or column of the image sensor of the rolling camera, by sequentially exposing each row or column of the image sensor, and then generate a plurality of image frames (S1310).

The signal reception device generates a one-dimensional brightness signal (first signal) based on an amount of charge captured by the image sensor according to the brightness value of the light source captured for each row (S1320). The first signal may include an FSK modulated signal composed of a high duty and a low duty both having a positive amplitude value, and OFDM modulated signals 1511 and 1513 mixed with both a high duty 1511 and a low duty 1513 of the FSK modulated signal.

The signal reception device may perform a convolution operation on the first signal and a plurality of different matched filters (S1330), and in some embodiments, may determine a frequency of the FSK modulated signal and a start position of the OFDM modulated signal based on the result of the convolution operation, wherein the FSK modulated signal and the OFDM modulated signal are included in the first signal.

Referring to FIG. 14, the plurality of matched filters may be a plurality of filters predetermined to output a maximum output value in response to a signal of each of the frequencies used for FSK modulation in the signal transmission device.

Referring to FIG. 15, a method of determining, by the signal reception device, the frequency of the FSK modulated signal and the start position of the OFDM modulated signal will be described, wherein the FSK modulated signal and the OFDM modulated signal are included in the first signal.

The signal reception device may perform a convolution operation on all of the plurality of matched filters and the first signal. The first signal may be a signal determined for each image frame.

The signal reception device may determine, as the frequency of the FSK modulated signal, a frequency corresponding to a matched filter which provides the highest value among results of the convolution operation of all of the plurality of matched filters and the first signal. The signal reception device may detect the FSK modulated signal based on the determined frequency of the FSK modulated signal and <Table 1>, demodulate the detected FSK modulated signal, and then remove the Ab bits to extract data.

The signal reception device may determine a plurality of positions of the first signal that have maximum values (1521, 1525, 1529) or minimum values (1523, 1527) based on results of the convolution operation of the first signal and a first matched filter, wherein the first matched filter is a matched filter providing the highest value of the results of the convolution operation.

The signal reception device may determine that the high duty of the FSK modulated signal (thus, a frame of an OFDM modulated signal mixed with the high duty) starts at the positions having the maximum values (1521, 1525, and 1529) in the results of the convolution operation of the first matched filter and the first signal. In addition, the signal reception device may determine that the low duty of the FSK modulated signal (thus, a frame of an OFDM modulated signal mixed with the low duty) starts at the locations having the minimum values (1523 and 1527) in the results of the convolution operation of the first matched filter and the first signal. The signal reception device may detect the OFDM modulated signal at each position of the first signal corresponding to the maximum values (1521, 1525, 1529) or the minimum values (1523, 1527), demodulate the OFDM modulated signal by performing the DFT, the Hermitian mapping, or the like on the detected OFDM modulated signal, and extract data from the demodulated signal.

As described above with respect to the signal transmission device, the data extracted by demodulating the FSK-modulated signal and the OFDM-modulated signal respectively detected from the first signal may be different from each other and may have different data rates.

The signal reception device may demodulate a predetermined number of OFDM symbols corresponding to the frequency of the FSK modulated signal (that is, the first matched filter) in the first signal between points where the adjacent maximum and minimum values are located.

For example, when a result of the convolution operation of the first signal and the first matched filter corresponding to f1 of FIG. 3, among the results of the convolution operation of the first signal and the plurality of matched filters, is the highest value, two OFDM symbols may be extracted from the first signal 1511 between points where the adjacent maximum and the minimum values (1521 and 1523) of the first signal 1510 are located.

As described above with respect to the signal transmission method, in the first signal that the signal reception device receives and generates from the LED light source of the signal transmission device, the OFDM symbol may also be extracted from the low duty 1513 of the FSK modulated signal.

When the FSK modulated signal and the OFDM modulated signal included in the first signal are detected, the FSK decoder 1230 and the OFDM decoder 1240 may extract different types of data based on the FSK modulated signal and the OFDM modulated signal, respectively.

Figure 16:
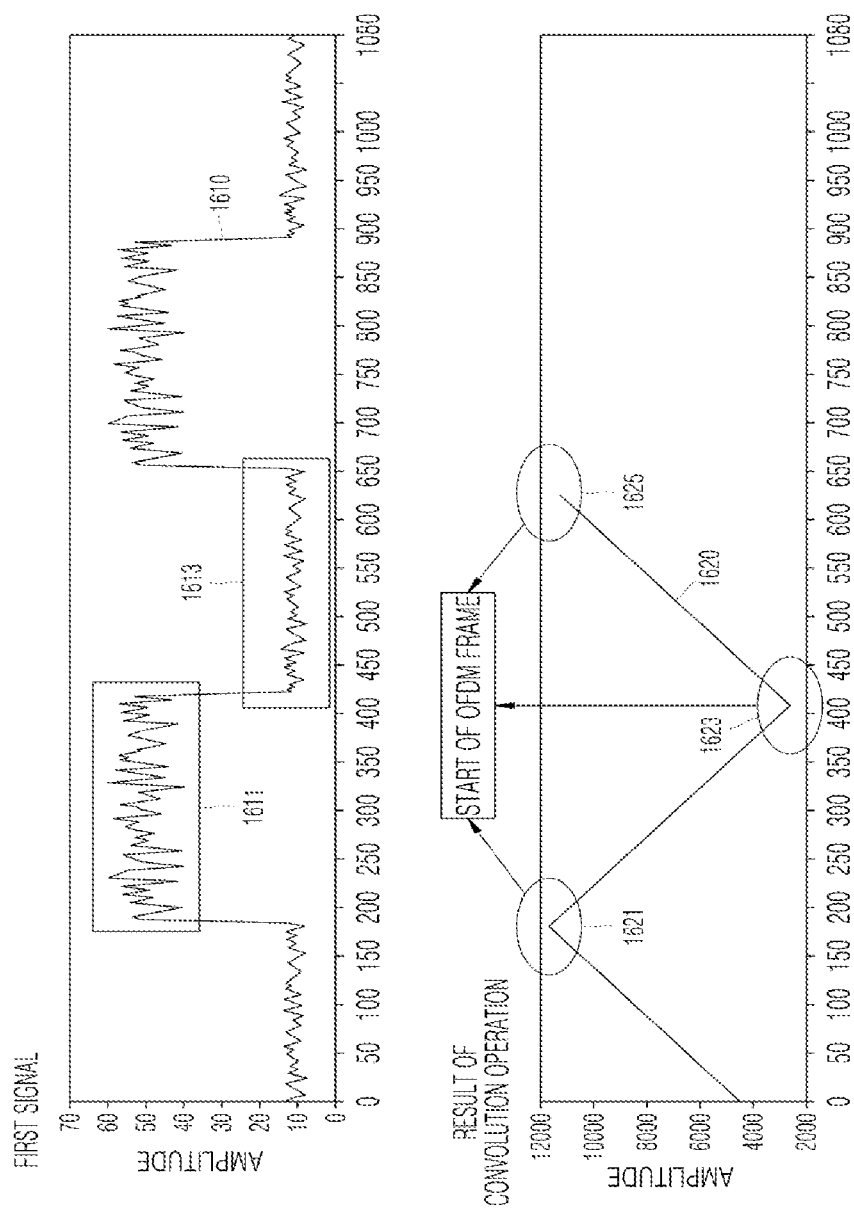
FIG. 16 is a diagram illustrating a method for determining a start position of an OFDM modulated signal, according to some embodiments of the present disclosure.

Referring to FIG. 16, the frequency of the FSK modulated signal and the start position of the OFDM modulated signal that are included in maximum values (1621, 1625) and a minimum value (1623) in a result (1620) of the convolution operation on the other first matched filter having the highest result when performing the convolution operation with a first signal 1610 generated from another image frame by the signal reception device may also be determined as described above, and the FSK modulated signal and the OFDM modulated signal may also be detected in the same manner as above. A number of OFDM symbols that correspond to the first matched filter having the highest result when performing the convolution operation with the first signal 1610 illustrated in FIG. 16 but are different from the number illustrated in FIG. 15 may be extracted from the OFDM modulated signal of the first signal 1610.

Figure 17:
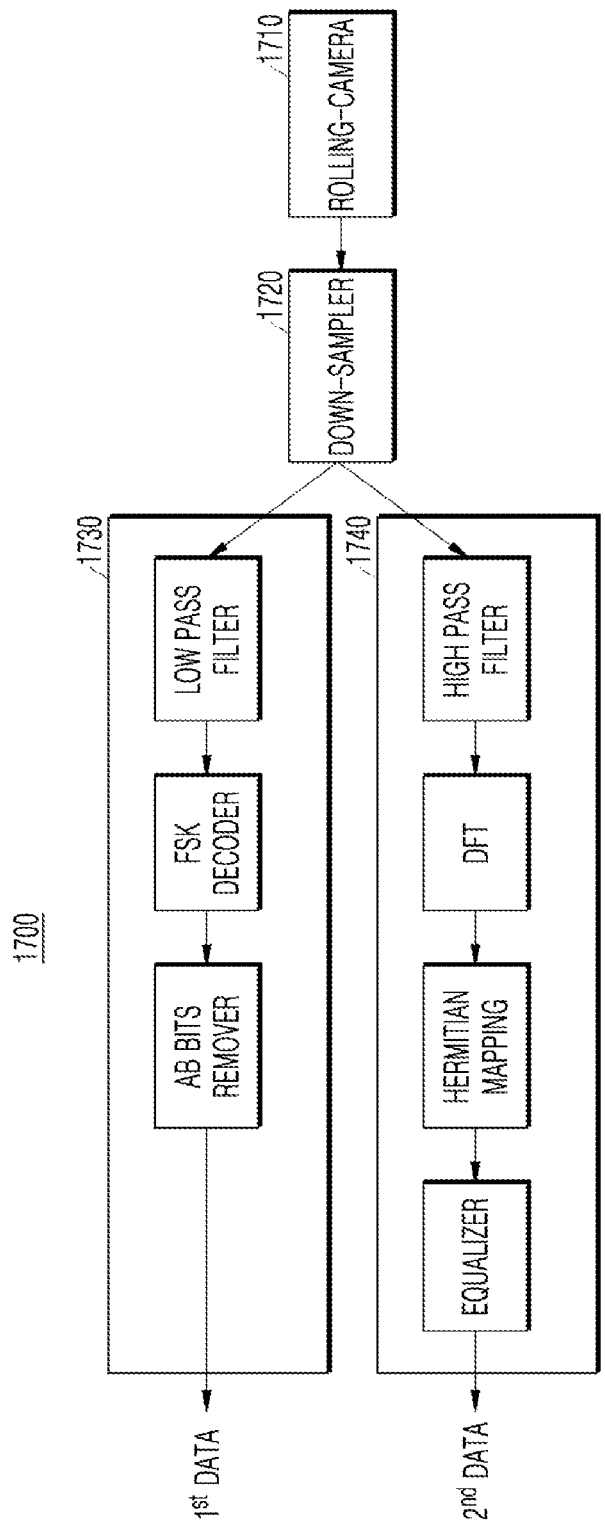
FIG. 17 is a block diagram illustrating a configuration of a signal reception device, according to some embodiments of the present disclosure.

FIG. 17 illustrates a signal reception device 1700 according to some embodiments of the present disclosure.

The signal reception device 1700 may include a rolling camera 1710 configured to generate an image based on a signal obtained by an image sensor in a rolling-shutter method that receives an optical signal, a down-sampler 1720 configured to down-sample the image obtained by the image sensor into a one-dimensional signal, an FSK decoder 1730, and an OFDM decoder 1740. The FSK decoder 1730 includes a low pass filter configured to detect an FSK modulated signal using the low pass filter, an FSK decoder configured to perform decoding based on a predetermined M-ary FSK frequency table period, and an Ab bits remover configured to remove Ab bits. The OFDM decoder 1740 includes a high pass filter configured to detect an OFDM modulated signal using the high pass filter, a discrete Fourier transform (DFT) transformer configured to perform the DFT after removing a cyclic prefix, a Hermitian mapper, an equalizer configured to reduce amplitude deformation, and a QAM demodulator.

The rolling camera continuously captures an ON/OFF image of an LED light source multiple times at different times, and generates an image frame by storing each captured image in one row or column of the image sensor. The rolling camera may obtain a signal value corresponding to the brightness of the LED light source according to the ON/OFF of the LED light source, from one row or column of the image sensor of the rolling camera, by sequentially exposing each row or column of the image sensor. The rolling camera may generate a plurality of image frames. In the following description, it is assumed that the rolling camera sequentially exposes each row of the image sensor.

The down-sampler generates a one-dimensional brightness signal (first signal) based on an amount of charge captured by the image sensor according to a brightness value of the light source captured for each row.

Figure 19:
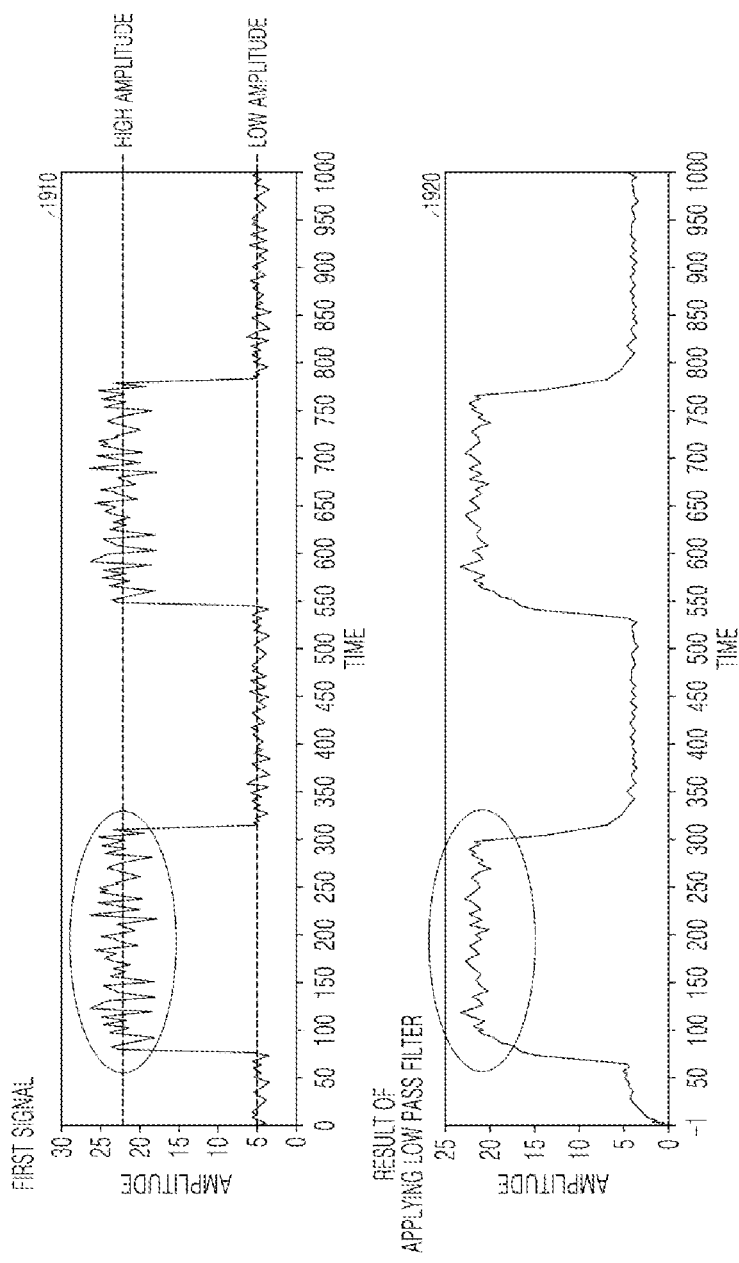
FIG. 19 is a diagram illustrating a method for generating an FSK modulated signal, according to some embodiments of the present disclosure.

The first signal generated by the down-sampler based on the plurality of image frames may be a signal 1910 as illustrated in FIG. 19. Values in consideration of the order of each row and the rolling-rate of the camera may be set as a time axis of the first signal.

The first signal is generated by the rolling camera receiving the ON/OFF image of the LED light source according to the hybrid waveform generated by the signal transmission device 100 as illustrated in FIG. 5 or FIG. 10. In addition, the first signal may include an FSK modulated signal and an OFDM modulated signal.

Figure 20:
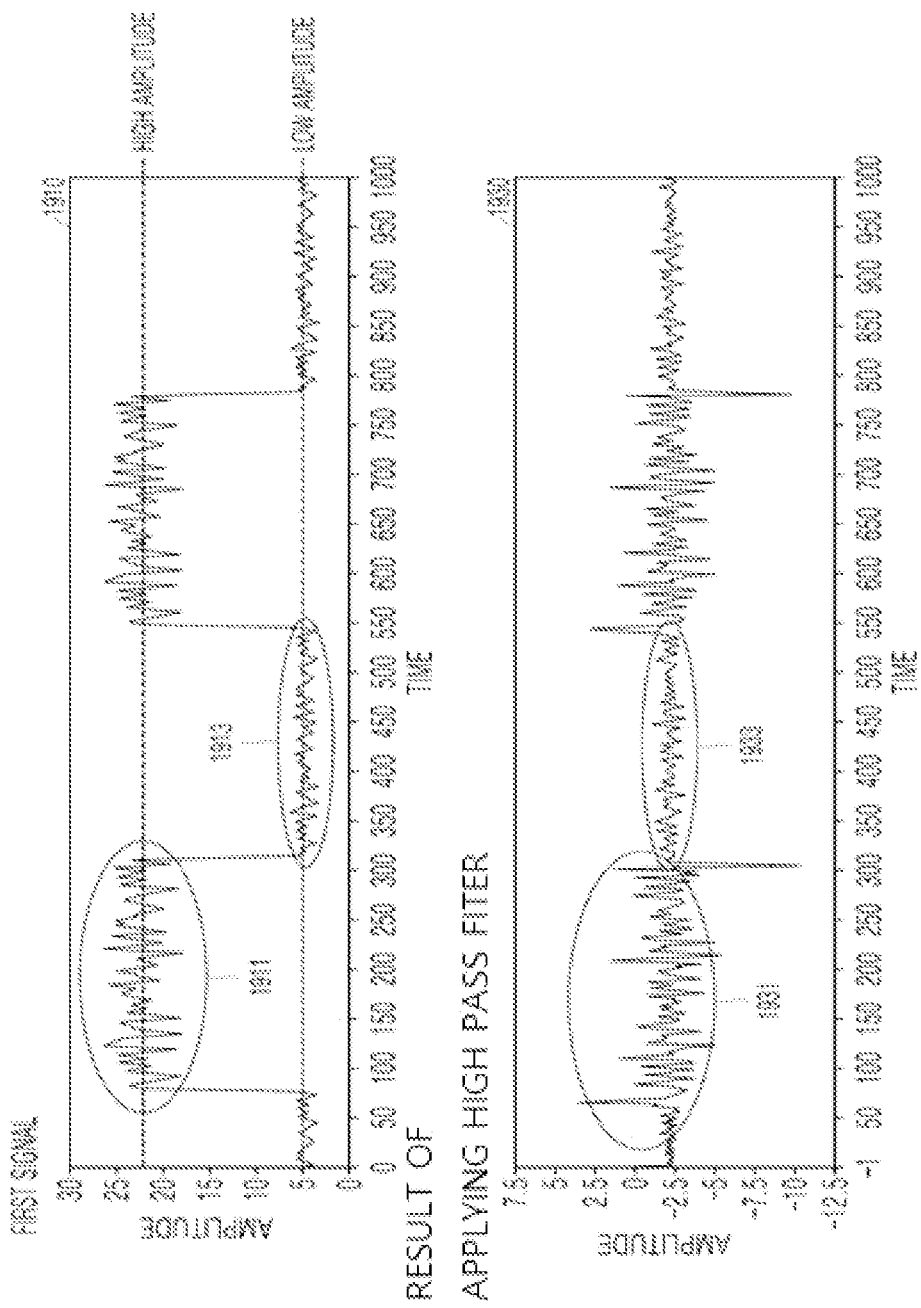
FIG. 20 is a diagram illustrating a method for generating an OFDM modulated signal, according to some embodiments of the present disclosure.

Referring to FIG. 19 and FIG. 20, the first signal 1910 may include an FSK modulated signal 1920 composed of a high duty and a low duty and OFDM modulated signal 1930 mixed with both a high duty 1911 and a low duty 1913. Both the high duty and the low duty may have a positive amplitude value.

The low pass filter may detect the FSK modulated signal included in the first signal based on a result of applying the low pass filter to the first signal, and the high pass filter may detect the OFDM modulated signal included in the first signal based on a result of applying the high pass filter to the first signal. The FSK decoder 1730 and the OFDM decoder 1740 may extract different types of data based on the detected FSK modulated signal and OFDM modulated signal, respectively.

Figure 18:
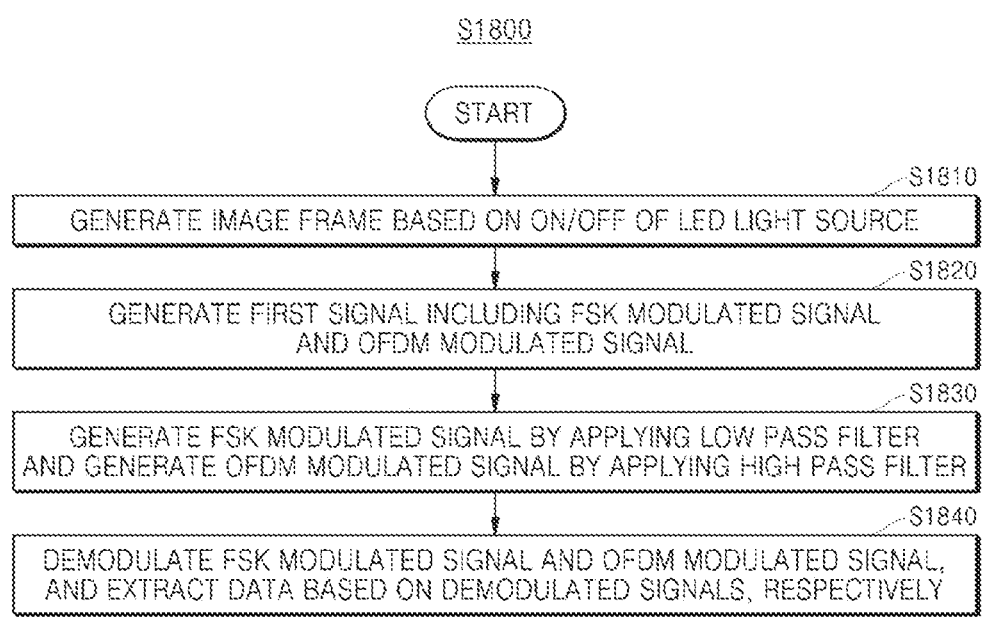
FIG. 18 is a flowchart illustrating a signal reception method performed by a signal reception device, according to some embodiments of the present disclosure.

FIG. 18 illustrates a signal reception method performed by the signal reception device, according to some embodiments of the present disclosure.

The signal reception device may obtain a signal value corresponding to the brightness of the LED light source according to the ON/OFF of the LED light source, from one row or column of the image sensor of the rolling camera, by sequentially exposing each row or column of the image sensor, and then generate a plurality of image frames (S1810).

The signal reception device generates a one-dimensional brightness signal (first signal) based on an amount of charge captured by the image sensor according to the brightness value of the light source captured for each row (S1820). The first signal may include an FSK modulated signal composed of a high duty and a low duty both having a positive amplitude value, and OFDM modulated signals 1911 and 1913 mixed with both a high duty 1911 and a low duty 1913 of the FSK modulated signal.

The signal reception device may generate the FSK modulated signal by applying the low pass filter to the first signal, and may generate the OFDM modulated signal by applying the high pass filter to the first signal (S1830).

FIG. 19 illustrates a step of generating the FSK modulated signal by applying the low pass filter to the first signal.

The first signal 1910 generated from the image frame by the image sensor of the rolling camera may include an FSK modulated signal in the form of a low-frequency pulse and an OFDM modulated signal in the form of a high-frequency pulse. The FSK modulated signal may be composed of a high duty and a low duty both having a positive amplitude value, and the high-frequency OFDM modulated signal may be included in the both the high duty and the low duty.

The signal reception device may extract zero-crossing points from a result of applying, to the first signal, a low pass filter for blocking a waveform having a frequency equal to or higher than a predetermined frequency, extract a frequency period using a time between the extracted zero-crossing points, or determine the frequency of the FSK modulated signal based on various known methods not disclosed herein.

In some embodiments, the signal reception device may determine amplitude values of both the high duty and the low duty of the FSK modulated signal by scanning the first signal or a result of applying the low pass filter to the first signal, and determine an intermediate value of the amplitude values as a reference value for determining the high duty and the low duty.

After removing the Ab bits, the signal reception device may detect the bit data based on the frequency of the determined FSK modulated signal and the relationship between the respective information bits of <Table 1> or <Table 2> and the pulse waves having the specific pulse frequency.

Referring to FIG. 19, frequency interference may be removed or reduced by applying the low pass filter to the first signal, thereby allowing data from the FSK modulated signal to be easily decoded.

FIG. 20 illustrates a step of generating an OFDM modulated signal by applying a high pass filter to the first signal.

The first signal 1910 generated from the image frame by the image sensor of the rolling camera may include an FSK modulated signal in the form of a low-frequency pulse and an OFDM modulated signal in the form of a high-frequency pulse. The FSK modulated signal may be composed of a high duty and a low duty both having a positive amplitude value, and the high-frequency OFDM modulated signals 1911 and 1913 may be included in both the high duty and the low duty.

Referring to FIG. 20, the signal reception device may obtain the OFDM modulated signal 1930 from which the low frequency FSK modulated signal is removed by applying, to the first signal, a high pass filter for blocking a waveform having a frequency equal to or less than a predetermined frequency.

The signal reception device may detect a start frame from the OFDM modulated signal 1930 in consideration of the data packet structure of FIG. 4, detect rear-end Ab bits disposed at a front end of the start frame and front-end Ab bits disposed at the front end of the start frame and then compare the detected Ab bits, and recover a payload based on the front-end and rear-end Ab bits.

The signal reception device may convert the OFDM modulated signal 1930 (which may be the payload described above) from which an FSK modulated signal of a serial form is removed, into a parallel form, transform OFDM symbols in a time domain into OFDM symbols in a frequency domain by performing the discrete Fourier transform (DFT) after removing an original cyclic prefix (CP) inserted into each of the OFDM symbols, and perform a de-mapping operation on the transformed OFDM symbols. The signal reception device may obtain final data by converting data including the de-mapped OFDM symbols from the parallel form to the serial form again and then decoding the converted symbols.

In this process, the signal reception device may demodulate the OFDM modulated signal 1930 with an OFDM decoder, and perform synchronization of the demodulated OFDM modulated signal by equalizing the demodulated signal.

A method of demodulating the OFDM modulated signal with the OFDM decoder is known to those of ordinary skill in the art, so a detailed description thereof will be omitted.

In some embodiments, after synchronizing with the FSK modulated signal, the signal reception device may extract as many OFDM symbols as the number of OFDM symbols included in the high duty and low duty of the FSK modulated signal as illustrated in FIG. 3, in consideration of the determined pulse frequency of the FSK modulated signal and the number of the high duty and the low duty of the FSK modulated signal. In such a case, the number of OFDM symbols included in the OFDM modulated signal corresponding to the high duty and the low duty of the first signal may be the same.

In some embodiments, the signal reception device may determine a width of each duty of the FSK modulated signal based on the high duty and low duty determined from the detected FSK modulated signal, and demodulate the OFDM signal based on a signal obtained from the high duty and the low duty in consideration of the width of the FSK modulated signal.

As described above with respect to the signal transmission device, data extracted by demodulating the FSK-modulated signal and the OFDM-modulated signal respectively detected from the first signal may be different from each other and may have different data rates.

Referring to FIG. 20, frequency interference may be removed or reduced by applying the high pass filter to the first signal, thereby allowing data from the OFDM modulated signal to be easily decoded.

The present disclosure described above may be implemented as a computer-readable code in a medium on which a program is written. The computer readable medium includes all types of recording devices in which data readable by a computer system may be stored. Examples of the computer readable medium, a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like. Moreover, the computer may include a processor of the signal transmission device or the signal reception device.

Meanwhile, the computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiment described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

Therefore, the present disclosure is thus not limited to the example embodiments described above, and rather intended to include the following appended claims, and all modifications, equivalents, and alternatives falling within the spirit and scope of the following claims.

What is claimed is:

1. A device for transmitting a signal using a hybrid waveform, comprising:
   a modulator configured to modulate an input signal; and
   a signal transmitter configured to transmit the modulated final transmission signal through an LED light source,
   wherein the modulator is configured to:
      modulate first information into a pulse signal based on frequency shift keying (FSK), and modulate second information into an orthogonal frequency division multiplexing (OFDM) signal, wherein the first information and the second information are different from each other; and
      mix the pulse signal and the OFDM signal into one waveform to generate the final transmission signal.

2. The device of claim 1, wherein the modulator is configured to:
   configure the first information as a high signal and a low signal; and
   modulate the low signal into a pulse signal having a positive value.

3. The device of claim 2, wherein the modulator is configured to mix the OFDM signal with both the high signal and the low signal of the pulse signal.

4. The device of claim 1, wherein the modulator is configured to map respective information bits corresponding to the first information to one of a plurality of pulse signals having different predetermined frequencies, and
   wherein each frequency of the plurality of pulse signals is based on the number of OFDM symbols of the OFDM signal mixed with one period of the pulse signal.

5. The device of claim 1, wherein the modulator is configured to:
   modulate the first information into a pulse signal composed of a high signal and a low signal; and
   generate the final transmission signal by mixing the OFDM signal only with the high signal.

6. The device of claim 5, further comprising a controller configured to determine a distance to a receiver receiving the final transmission signal, and
   wherein the modulator is configured to perform the modulation into the pulse signal, perform the modulation into the OFDM signal, and then generate the final transmission signal, based on a result that the distance to the receiver is equal to or greater than a predetermined reference distance.

7. A device for receiving a signal using a hybrid waveform, comprising:
   a receiver comprising a camera configured to generate an image composed of a plurality of image frames by capturing an optical signal multiple times at different times in a rolling-shutter method that receives the optical signal; and
   a demodulator configured to demodulate the optical signal based on the image,
   wherein the demodulator is configured to:
      demodulate a first signal from the image received through the camera according to an FSK demodulation scheme based on a rolling-shutter;
      demodulate a second signal from the image according to an OFDM signal demodulation scheme based on the rolling-shutter;

extract first information based on the first signal; and
extract second information based on the second signal,
wherein the first information and the second information are different from each other.

8. The device of claim 7, wherein the demodulator comprises an FSK decoder configured to demodulate the first signal and an OFDM decoder configured to demodulate the second signal, and
wherein the OFDM decoder is configured to demodulate the second signal from both a high duty and a low duty of an FSK pulse signal from which the first signal is demodulated.

9. The device of claim 7, wherein the demodulator comprises an FSK decoder configured to demodulate the first signal and an OFDM decoder configured to demodulate the second signal, and
wherein the OFDM decoder is configured to demodulate the second signal only from a high duty of an FSK pulse signal from which the first signal is demodulated.

10. The device of claim 9, wherein the FSK decoder is configured to:
determine an amplitude value of the high duty constituting the FSK pulse signal by scanning the image; and
determine a width of each high duty of the FSK pulse signal based on the determined amplitude value of the high duty.

11. The device of claim 10, wherein the OFDM decoder is configured to demodulate the second signal based on the determined width of the high duty.

12. The device of claim 10, wherein the demodulator is configured to extract a number of OFDM symbols corresponding to the number of a high duty and a low duty of the first signal, which is the FSK modulated signal.

13. The device of claim 10, wherein the demodulator is configured to determine a frequency of the FSK modulated signal corresponding to a result of applying the low pass filter by using a predetermined M-ary frequency shift keying (M-FSK) frequency table on the result of applying the low pass filter.

14. The signal reception device of claim 7, wherein the demodulator is configured to:
generate a third signal including an FSK modulated signal and an OFDM modulated signal based on the plurality of image frames;
perform a convolution operation on the third signal and a plurality of predetermined matched filters;
detect the first signal and the second signal based on a result of the convolution operation, wherein the first signal is the FSK modulated signal included in the third signal and the second signal is the OFDM modulated signal included in the third signal; and
output the first information and the second information based on the FSK modulated signal and the OFDM modulated signal, respectively.

15. The device of claim 14, wherein the demodulator is configured to determine a frequency of the FSK modulated signal and a start position of the OFDM modulated signal based on the result of the convolution operation, wherein the FSK modulated signal and the OFDM modulated signal is included in the third signal.

16. The device of claim 15, wherein the demodulator is configured to detect the FSK modulated signal based on the frequency of the FSK modulated signal, and detect the OFDM modulated signal based on the start position of the OFDM modulated signal.

17. The device of claim 14, wherein the demodulator is configured to:
determine, as the frequency of the FSK modulated signal, a frequency corresponding to a first matched filter providing the largest value among results of the convolution operation of the third signal and the plurality of predetermined matched filters; and
detect the first signal, which is the FSK modulated signal, based on the frequency of the FSK modulated signal.

18. The device of claim 17, wherein the demodulator is configured to:
determine a plurality of maximum values and a plurality of minimum values in a result of the convolution operation of the third signal and the first matched filter; and
detect the OFDM modulated signal based on the third signal between points where adjacent maximum and minimum values are located.

19. The device of claim 18, wherein the demodulator is configured to detect the second signal, which is the OFDM modulated signal, into which a number of OFDM symbols corresponding to the first matched filter are modulated.

20. The device of claim 7, wherein the demodulator is configured to:
generate a third signal including an FSK modulated signal and an OFDM modulated signal based on the plurality of image frames;
detect the first signal, which is the FSK modulated signal, by applying a low pass filter to the third signal;
generate the second signal, which is the OFDM modulated signal, by applying a high pass filter to the third signal; and
extract the first information and the second information based on the generated FSK modulated signal and OFDM modulated signal, respectively.

* * * * *

UNITED STATES PATENT AND TRADEMARK OFFICE
CERTIFICATE OF CORRECTION

| | | |
|---|---|---|
| PATENT NO. | : 11,329,727 B1 | Page 1 of 1 |
| APPLICATION NO. | : 17/236241 | |
| DATED | : May 10, 2022 | |
| INVENTOR(S) | : Yeong Min Jang and Ngoc Huy Nguyen | |

It is certified that error appears in the above-identified patent and that said Letters Patent is hereby corrected as shown below:

In the Specification

Column 6, Line 37: "($f_{oFDM}$)" should be -- ($f_{OFDM}$) --

Column 10, Line 40: "($f_{oFDM}$)" should be -- ($f_{OFDM}$) --

Signed and Sealed this
Thirtieth Day of August, 2022

*Katherine Kelly Vidal*

Katherine Kelly Vidal
*Director of the United States Patent and Trademark Office*